US012678694B2

(12) United States Patent
Wang

(10) Patent No.: US 12,678,694 B2
(45) Date of Patent: Jul. 14, 2026

(54) GUIDANCE METHOD AND APPARATUS IN THREE-DIMENSIONAL VIRTUAL ENVIRONMENT, DEVICE, AND MEDIUM

(71) Applicant: Tencent Technology (Shenzhen) Company Limited, Shenzhen (CN)

(72) Inventor: Ziyi Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 217 days.

(21) Appl. No.: 18/740,362

(22) Filed: Jun. 11, 2024

(65) Prior Publication Data

US 2024/0325904 A1 Oct. 3, 2024

Related U.S. Application Data

(63) Continuation of application No. PCT/CN2023/088602, filed on Apr. 17, 2023.

(30) Foreign Application Priority Data

Jun. 17, 2022 (CN) .......................... 202210691338.0

(51) Int. Cl.
*A63F 13/00* (2014.01)
*A63F 13/5375* (2014.01)
(52) U.S. Cl.
CPC ................................ *A63F 13/5375* (2014.09)
(58) Field of Classification Search
None
See application file for complete search history.

(56) References Cited

U.S. PATENT DOCUMENTS 5,772,509 A * 6/1998 Weiss ...................... G07F 17/32
463/16
5,850,352 A * 12/1998 Moezzi ................ H04N 13/246
348/E13.058
(Continued)

FOREIGN PATENT DOCUMENTS

CN 108579087 A 9/2018
CN 109364475 A 2/2019
(Continued)

OTHER PUBLICATIONS

Tencent Technology, ISR, PCT/CN2023/088602, Jun. 19, 2023, 2 pgs.

*Primary Examiner* — Paul A D'Agostino
(74) *Attorney, Agent, or Firm* — Morgan, Lewis & Bockius LLP

(57) ABSTRACT
This application discloses a method for guiding a virtual character to jump out of an aircraft in a three-dimensional virtual environment performed by a computer device. The method includes: in response to a marking operation by a user of the computer device, marking a target landing location on the ground of the three-dimensional virtual environment; in accordance with a determination that the virtual character jumps out of the aircraft and is in a landing state, displaying a three-dimensional path guidance line connecting a first position of the virtual character in the air and the target landing location on the ground, and the three-dimensional path guidance line indicating a manipulation mode for controlling the virtual character to land from the first position to the target location; and dynamically updating the three-dimensional path guidance line based on a current second position of the virtual character in the air.

20 Claims, 18 Drawing Sheets

(56) References Cited

U.S. PATENT DOCUMENTS

| | | | | |
|---|---|---|---|---|
| 5,876,284 | A * | 3/1999 | Acres | G07F 17/32 |
| | | | | 463/30 |
| 6,033,307 | A * | 3/2000 | Vancura | G07F 17/32 |
| | | | | 273/138.2 |
| 6,059,289 | A * | 5/2000 | Vancura | G07F 17/34 |
| | | | | 463/20 |
| 7,704,119 | B2 * | 4/2010 | Evans | A63H 17/14 |
| | | | | 446/454 |
| 8,616,981 | B1 * | 12/2013 | Guinn | G07F 17/34 |
| | | | | 463/31 |
| 8,827,160 | B1 * | 9/2014 | Pascal | G06Q 30/0267 |
| | | | | 235/462.01 |
| 9,520,014 | B1 * | 12/2016 | Moshier | G07F 17/32 |
| 10,540,848 | B2 * | 1/2020 | Kukita | G07F 17/3251 |
| 10,639,529 | B1 * | 5/2020 | Luciano, Jr. | A63B 60/46 |
| 11,158,170 | B2 * | 10/2021 | Thomas | G07F 17/3248 |
| 11,198,066 | B2 * | 12/2021 | Yu | A63F 13/5378 |
| 12,087,134 | B2 * | 9/2024 | Loos | G07F 17/3267 |
| 2001/0036857 | A1 * | 11/2001 | Mothwurf | G07F 17/323 |
| | | | | 463/25 |
| 2003/0078091 | A1 * | 4/2003 | Brandstetter | G07F 17/3211 |
| | | | | 463/20 |
| 2003/0125107 | A1 * | 7/2003 | Cannon | G07F 17/3244 |
| | | | | 463/25 |
| 2005/0130732 | A1 * | 6/2005 | Rothschild | G07F 17/32 |
| | | | | 463/20 |
| 2005/0148380 | A1 * | 7/2005 | Cannon | G07F 17/3211 |
| | | | | 463/16 |
| 2005/0269774 | A1 * | 12/2005 | Sorge | A63F 1/00 |
| | | | | 273/274 |
| 2006/0166731 | A1 * | 7/2006 | Yoshimi | G07F 17/3267 |
| | | | | 463/20 |
| 2006/0166733 | A1 * | 7/2006 | Hettinger | G07F 17/32 |
| | | | | 463/25 |
| 2008/0039194 | A1 * | 2/2008 | Walther | G07F 17/32 |
| | | | | 463/25 |
| 2010/0041464 | A1 * | 2/2010 | Arezina | G07F 17/32 |
| | | | | 463/25 |
| 2010/0178966 | A1 * | 7/2010 | Seydoux | A63F 13/213 |
| | | | | 463/2 |
| 2011/0244935 | A1 * | 10/2011 | Matthews | G07F 17/3295 |
| | | | | 463/9 |
| 2012/0088576 | A1 * | 4/2012 | Shepherd | G07F 17/3258 |
| | | | | 463/26 |
| 2012/0122529 | A1 * | 5/2012 | Lyons | G07F 17/3244 |
| | | | | 463/1 |
| 2012/0214568 | A1 * | 8/2012 | Herrmann | H04L 67/52 |
| | | | | 463/16 |
| 2012/0244929 | A1 * | 9/2012 | Oakes | G07F 17/32 |
| | | | | 707/741 |
| 2013/0035149 | A1 * | 2/2013 | Oakes | G07F 17/329 |
| | | | | 463/17 |
| 2014/0066181 | A1 * | 3/2014 | Fong | G07F 17/3211 |
| | | | | 463/25 |
| 2014/0378204 | A1 * | 12/2014 | Michel | G07F 17/329 |
| | | | | 463/17 |
| 2015/0310700 | A1 * | 10/2015 | Arnone | G07F 17/326 |
| | | | | 463/16 |
| 2015/0310703 | A1 * | 10/2015 | Katz | G07F 17/3244 |
| | | | | 463/25 |
| 2015/0371488 | A1 * | 12/2015 | Watkins | G07F 17/326 |
| | | | | 463/20 |
| 2017/0116824 | A1 * | 4/2017 | Katz | G07F 17/3244 |
| 2017/0278350 | A1 * | 9/2017 | Kukita | A63F 13/30 |
| 2018/0021684 | A1 * | 1/2018 | Benedetto | A63F 13/86 |
| | | | | 463/24 |
| 2018/0025580 | A1 * | 1/2018 | Rader | G07F 17/3255 |
| | | | | 463/16 |
| 2018/0288391 | A1 * | 10/2018 | Lee | G06F 3/011 |
| 2018/0326283 | A1 * | 11/2018 | Sexton | A63B 69/32 |
| 2019/0287342 | A1 * | 9/2019 | Rader | G07F 17/3255 |
| 2020/0111301 | A1 * | 4/2020 | Wasinger | G07F 17/3267 |
| 2020/0289938 | A1 * | 9/2020 | Taylor | A63F 13/798 |
| 2021/0097815 | A1 * | 4/2021 | Thomas | G07F 17/3213 |
| 2021/0097816 | A1 * | 4/2021 | Burns | G07F 17/3237 |
| 2021/0319656 | A1 * | 10/2021 | Vasquez | G07F 17/3239 |
| 2022/0172564 | A1 * | 6/2022 | Loos | G07F 17/3267 |

FOREIGN PATENT DOCUMENTS

| | | | |
|---|---|---|---|
| CN | 113694528 | A | 11/2021 |
| JP | 2020163210 | A | 10/2020 |
| WO | WO 2022105523 | A1 | 5/2022 |

* cited by examiner

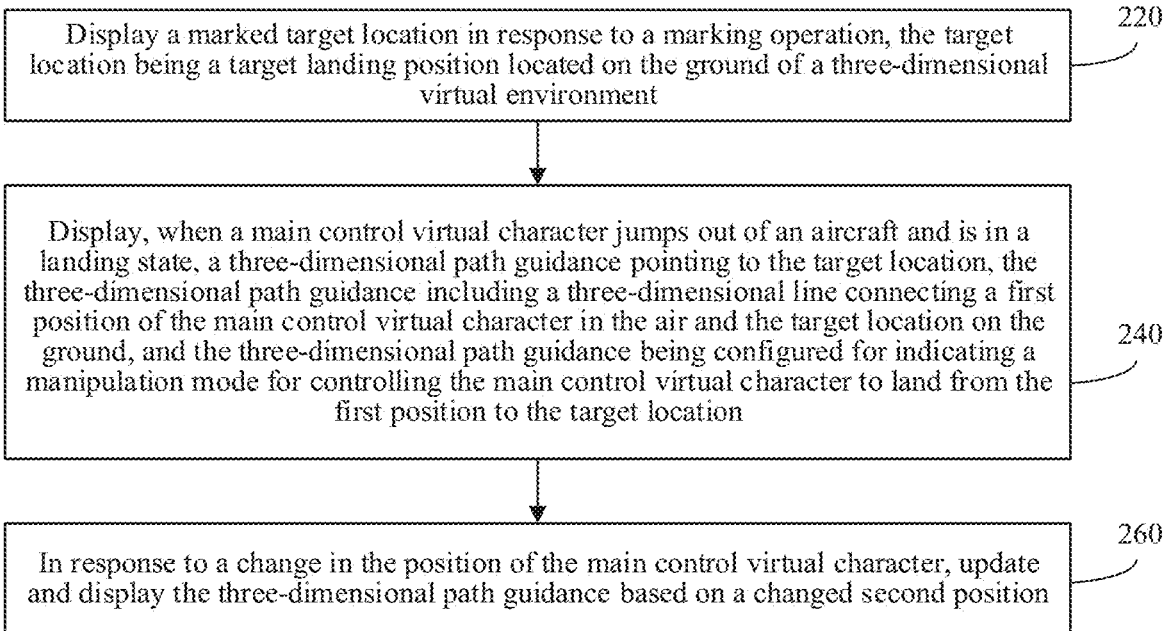

Display a marked target location in response to a marking operation, the target location being a target landing position located on the ground of a three-dimensional virtual environment
— 220

Display, when a main control virtual character jumps out of an aircraft and is in a landing state, a three-dimensional path guidance pointing to the target location, the three-dimensional path guidance including a three-dimensional line connecting a first position of the main control virtual character in the air and the target location on the ground, and the three-dimensional path guidance being configured for indicating a manipulation mode for controlling the main control virtual character to land from the first position to the target location
— 240

In response to a change in the position of the main control virtual character, update and display the three-dimensional path guidance based on a changed second position
— 260

FIG. 2

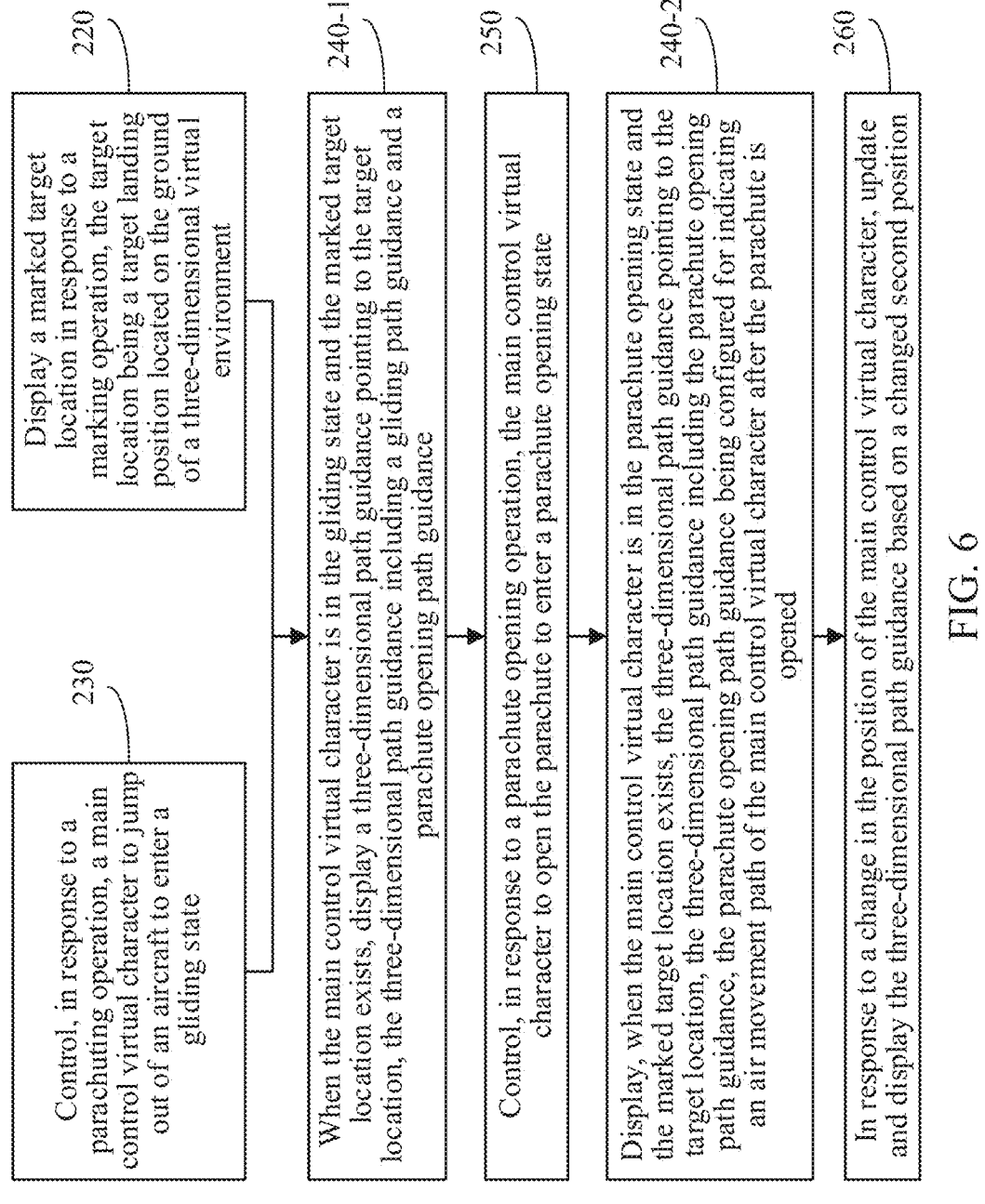

Display a marked target location in response to a marking operation, the target location being a target landing position located on the ground of a three-dimensional virtual environment

— 220

Control, in response to a parachuting operation, a main control virtual character to jump out of an aircraft to enter a gliding state

— 230

When the main control virtual character is in the gliding state and the marked target location exists, display a three-dimensional path guidance pointing to the target location, the three-dimensional path guidance including a gliding path guidance and a parachute opening path guidance

— 240-1

Control, in response to a parachute opening operation, the main control virtual character to open the parachute to enter a parachute opening state

— 250

Display, when the main control virtual character is in the parachute opening state and the marked target location exists, the three-dimensional path guidance pointing to the target location, the three-dimensional path guidance including the parachute opening path guidance, the parachute opening path guidance being configured for indicating an air movement path of the main control virtual character after the parachute is opened

— 240-2

In response to a change in the position of the main control virtual character, update and display the three-dimensional path guidance based on a changed second position

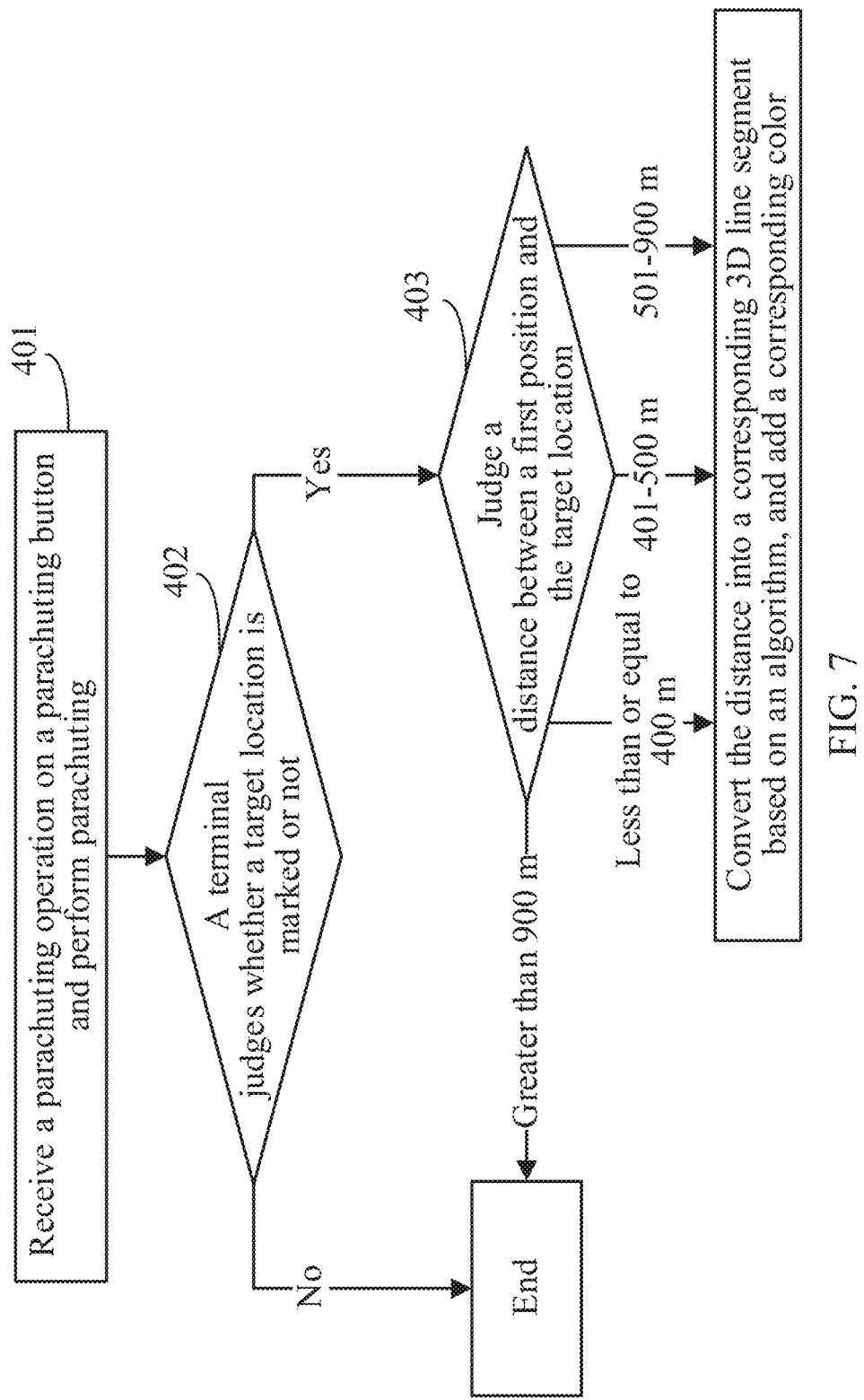

401

Receive a parachuting operation on a parachuting button and perform parachuting

402

A terminal judges whether a target location is marked or not

Yes

No

403

Judge a distance between a first position and the target location 501-900 m 401-500 m Less than or equal to 400 m Greater than 900 m Convert the distance into a corresponding 3D line segment based on an algorithm, and add a corresponding color End

FIG. 7

Known condition
An angle of parachuting is slant, and the player moves forward while landing downward.
Parachuting position of the player
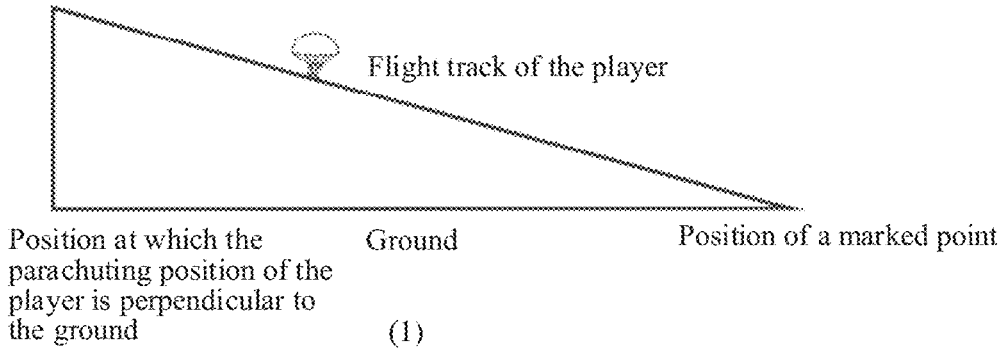
Position at which the parachuting position of the player is perpendicular to the ground
Ground
Position of a marked point
(1)
For example
When A=200, and B=500, the following figure may be obtained
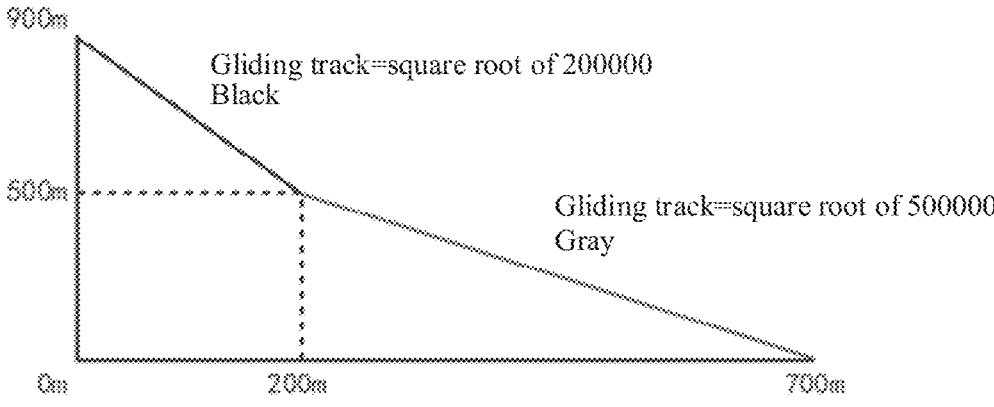
(2)
FIG. 8

A parachuting range is a rounded rectangle with a width of 450 m plus a flight route length and 450 m, and a height of 900 m Display an aircraft, where a main control virtual character is located in the aircraft          210

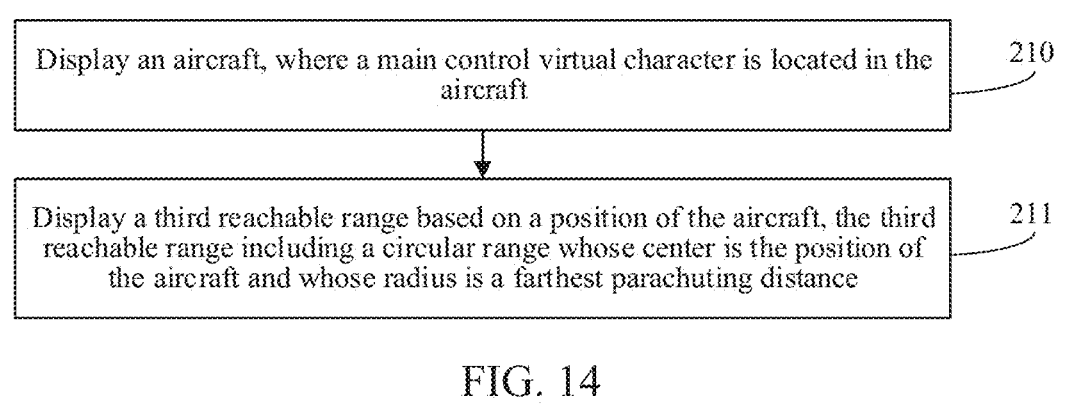

Display a third reachable range based on a position of the aircraft, the third reachable range including a circular range whose center is the position of the aircraft and whose radius is a farthest parachuting distance          211

FIG. 14

GUIDANCE METHOD AND APPARATUS IN THREE-DIMENSIONAL VIRTUAL ENVIRONMENT, DEVICE, AND MEDIUM

CROSS-REFERENCE TO RELATED APPLICATIONS

This application is a continuation application of PCT Patent Application No. PCT/CN2023/088602, entitled "GUIDANCE METHOD AND APPARATUS IN THREE-DIMENSIONAL VIRTUAL ENVIRONMENT, DEVICE, AND MEDIUM" filed on Apr. 17, 2023, which claims priority to Chinese Patent Application No. 202210691338.0, entitled "GUIDANCE METHOD AND APPARATUS IN THREE-DIMENSIONAL VIRTUAL ENVIRONMENT, DEVICE, AND MEDIUM" filed with the China National Intellectual Property Administration on Jun. 17, 2022, both of which are incorporated herein by reference in their entirety.

FIELD OF THE TECHNOLOGY

Embodiments of this application relate to the field of virtual environments, and in particular, to a guidance method and apparatus in a three-dimensional virtual environment, a device, and a medium.

BACKGROUND OF THE DISCLOSURE

In tactical competitive shooting games, when a game starts, a virtual character needs to take an aircraft and parachute into a virtual environment. In the related art, a final landing position of the virtual character by parachuting depends on a plurality of factors, for example, timing when the virtual character jumps out of the aircraft, a direction in which the virtual character glides in the air after jumping out of the aircraft, a speed of gliding, timing when the virtual character opens a parachute, and a moving direction and a moving speed of the virtual character after the parachute is opened. For a novice player, it is difficult for the player to control a main control virtual character to land at a target location accurately by performing the foregoing complex parachuting operations.

SUMMARY

This application provides a guidance method and apparatus in a three-dimensional virtual environment, a device, and a medium, to provide, based on the target location, an operation indication for parachuting, to control the main control virtual character to land at the target location. The technical solutions are as follows:

According to a first aspect of this application, a method for guiding a virtual character to jump out of an aircraft in a three-dimensional virtual environment is performed by a computer device, the method including:

in response to a marking operation by a user of the computer device, marking a target landing location on the ground of the three-dimensional virtual environment;

in accordance with a determination that the virtual character jumps out of the aircraft and is in a landing state, displaying a three-dimensional path guidance line connecting a first position of the virtual character in the air and the target landing location on the ground, and the three-dimensional path guidance line indicating a manipulation mode for controlling the virtual character to land from the first position to the target location; and dynamically updating the three-dimensional path guidance line based on a current second position of the virtual character in the air.

According to an aspect of this application, a computer device is provided, the computer device including a processor and a memory, a computer program being stored in the memory, the computer program being loaded and executed by the processor and causing the computer device to implement the guidance method in a three-dimensional virtual environment described above.

According to another aspect of this application, a non-transitory computer-readable storage medium is provided, a computer program being stored in the storage medium, and the computer program being loaded and executed by a processor of a computer device to implement the guidance method in a three-dimensional virtual environment described above.

The technical solutions provided in embodiments of this application have at least the following beneficial effects:

When the main control virtual character marks the target location in the three-dimensional virtual environment before parachuting or in a parachuting process, the three-dimensional path guidance pointing to the target location is displayed in a virtual environment picture, where the three-dimensional path guidance is displayed as the three-dimensional line from the first position of the main control virtual character to the target location, a direction in which the three-dimensional line points to the target location may guide a moving direction of the main control virtual character, and an inclination degree at which the three-dimensional line points to the target location may guide a moving speed of the main control virtual character. In addition, with a movement of the position of the main control virtual character, the three-dimensional path guidance is updated in real time, and the main control virtual character is controlled, based on the three-dimensional path guidance, to accurately land at the target location, thereby improving control precision of the main control virtual character in the parachuting process and improving efficiency of man-machine interaction.

BRIEF DESCRIPTION OF THE DRAWINGS

FIG. 2 is a flowchart of a guidance method in a three-dimensional virtual environment according to an exemplary embodiment.

FIG. 6 is a flowchart of a guidance method in a three-dimensional virtual environment according to an exemplary embodiment.

FIG. 7 is a flowchart of a guidance method in a three-dimensional virtual environment according to an exemplary embodiment.

FIG. 8 is a schematic diagram of a guidance method in a three-dimensional virtual environment according to an exemplary embodiment.

FIG. 14 is a flowchart of a guidance method in a three-dimensional virtual environment according to an exemplary embodiment.

DESCRIPTION OF EMBODIMENTS

First, several terms involved in embodiments of this application are briefly introduced.

Three-dimensional virtual environment (or referred to as "virtual environment"): It is a virtual environment displayed (or provided) by a client when run on a terminal. The virtual environment may be a simulation environment of a real world, or may be a semi-simulation and semi-fictional environment, or may be a completely fictional environment. In some embodiments, the virtual environment is a battle environment for a virtual character. For example, in a battle royale game, at least one virtual character plays a single-round battle in the virtual environment, and the virtual character evades an attack initiated by an enemy unit and dangers (for example, a poison gas circle, a swamp, and the like) in the virtual environment, to survive in the virtual environment. When a hit point of the virtual character in the virtual environment is zero, the life of the virtual character in the virtual environment ends, and a final surviving virtual character is a winner.

Figure 1:
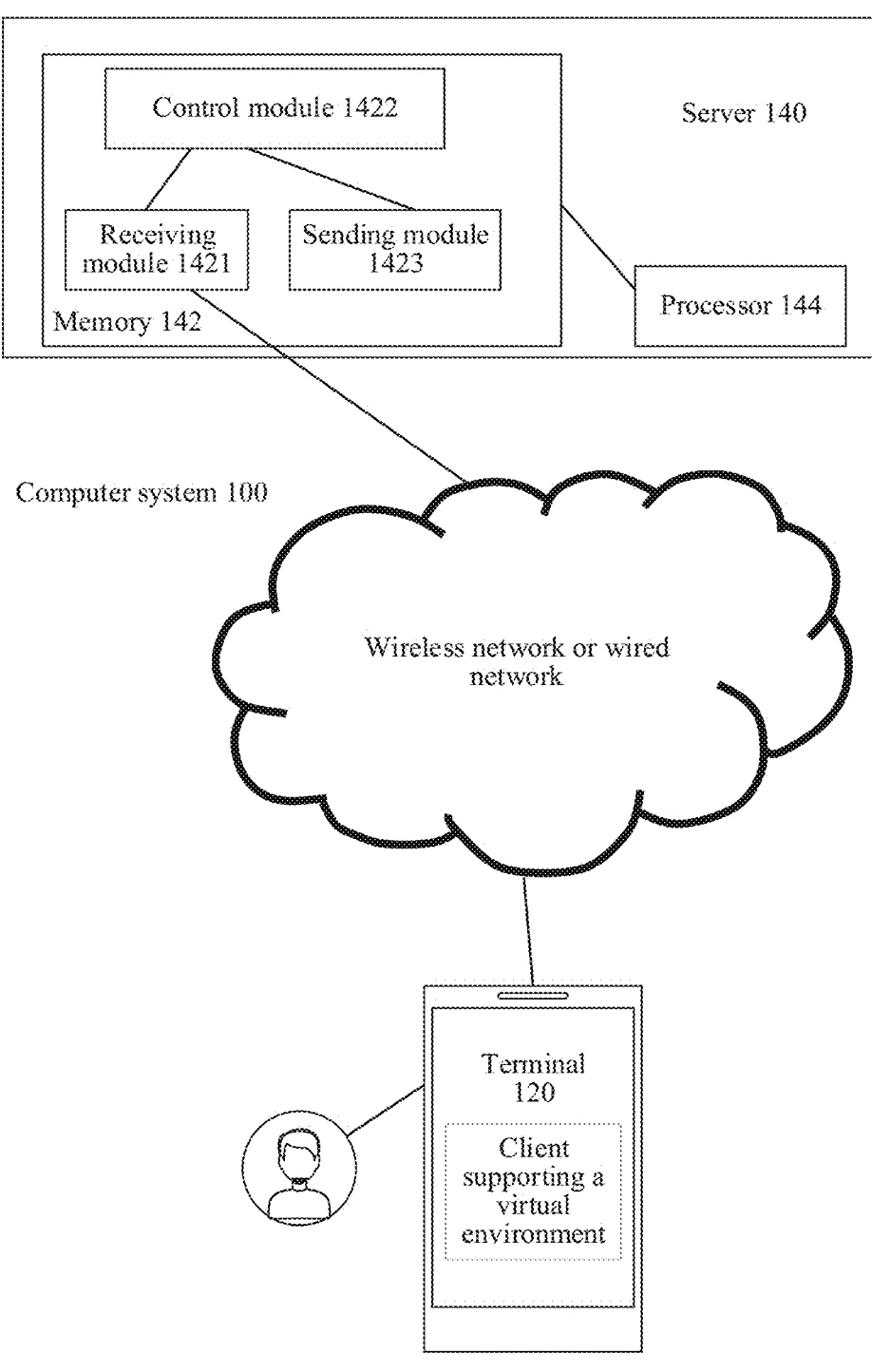
FIG. 1 is a structural block diagram of a computer system according to an exemplary embodiment.

FIG. 1 is a structural block diagram of a computer system according to an exemplary embodiment in this application. The computer system 100 includes a terminal 120 and a server 140.

A client supporting a virtual environment is installed and run on the terminal 120. A control account of a main control virtual character is logged in to the client. The client may be any one of a three-dimensional map program, a shooting game, a virtual reality (VR) application program, or an augmented reality (AR) program. The terminal 120 is a terminal used by a user, and the user uses the terminal 120 to control the main control virtual character located in the virtual environment to perform activities. The activities include but are not limited to, at least one of adjusting body posture, walking, running, jumping, riding, driving, aiming, picking-up, or using a throwing prop. For example, the main control virtual character is a virtual person, such as a simulation character object or a cartoon character object. For example, the user controls, through a UI control on a virtual environment picture, the main control virtual character to perform the activities.

The terminal 120 is connected to the server 140 by using a wireless network or a wired network.

The server 140 includes at least one of a server, a plurality of servers, a cloud computing platform, or a virtualization center. For example, the server 140 includes a processor 144 and a memory 142. The memory 142 includes a receiving module 1421, a control module 1422, and a sending module 1423. The receiving module 1421 is configured to receive a request sent by the client, for example, a request for controlling the virtual character to move. The control module 1422 is configured to control rendering of the virtual environment picture. The sending module 1423 is configured to send a response to the client, for example, sending, to the client, a response that a position of the virtual character has changed. The server 140 is configured to provide a background service for a client supporting the virtual environment. In some embodiments, the server 140 undertakes primary computing work, and the terminal 120 undertakes secondary computing work. Alternatively, the server 140 undertakes secondary computing work, and the terminal 120 undertakes primary computing work. Alternatively, the server 140 and the terminal 120 undertake computing work in a cooperative manner.

In some embodiments, the client may run on different operating system platforms (Android or IOS). In some embodiments, a device type of the terminal includes at least one of a smartphone, a smartwatch, an in-vehicle terminal, a wearable device, a smart television, a tablet computer, an e-book reader, an MP3 player, an MP4 player, a laptop portable computer, or a desktop computer. The following embodiment is described by using an example in which the terminal includes a smartphone. A person skilled in the art may learn that there may be more or fewer terminals. For example, there may be only one terminal, or there may be dozens of or hundreds of terminals, or there may be more terminals. The quantity and the device type of the terminals are not limited in embodiments of this application.

FIG. 2 is a flowchart of a guidance method in a three-dimensional virtual environment according to an exemplary embodiment of this application. Descriptions are made by using an example in which the method is applied to the terminal 120 (or the client installed on the terminal 120 and supporting the three-dimensional virtual environment) shown in FIG. 1. The method includes:

Operation 220. Display a marked target location in response to a marking operation, the target location being a target landing location located on the ground of a three-dimensional virtual environment.

Main control virtual character: It is a movable object controlled by a client in a virtual environment. The main control virtual character is a movable object controlled by a user in a three-dimensional virtual environment. In some embodiments, the user directly controls the virtual character to perform activities through the terminal. In some embodiments, the user controls the virtual character to perform activities through an external device connected to the terminal, for example, the user controls the virtual character to perform activities through a gamepad, a VR/AR device, and a motion sensing operation device, or the like. The external device and the terminal may be connected in a wired/ wireless manner. In some embodiments, the user controls the virtual character to perform activities in a manner such as voice control. The movable object may be a virtual character, a virtual animal, a cartoon character, or the like, for example, a character or an animal displayed in the three-dimensional virtual environment. In some embodiments, the virtual character is a three-dimensional model created based on a skeletal animation technology. Each virtual character has a respective shape and volume in the three-dimensional virtual environment and occupies some space in the three-dimensional virtual environment.

Figure 3:
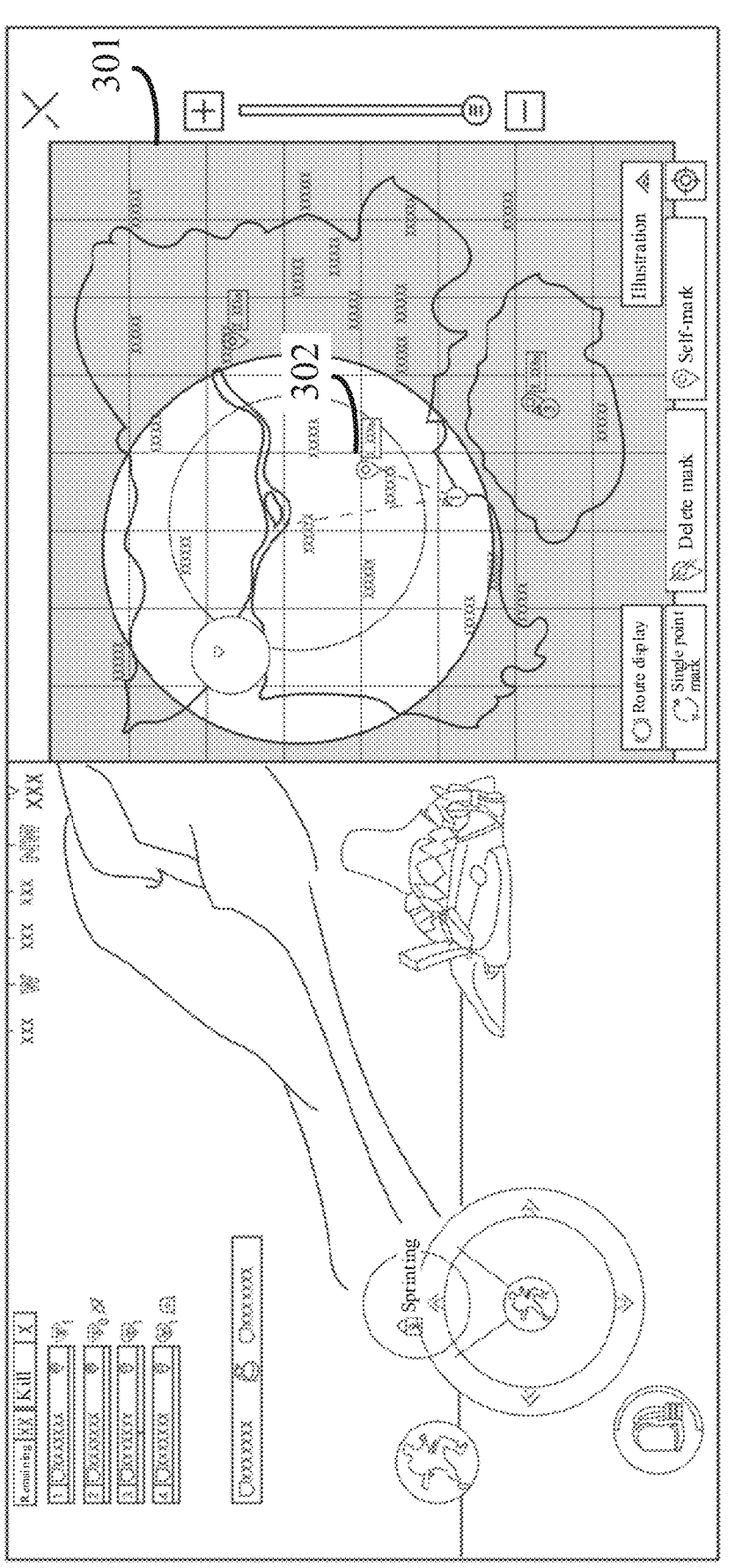
FIG. 3 is a schematic diagram of a guidance method in a three-dimensional virtual environment according to an exemplary embodiment.

The marking operation may be an operation of clicking a target location on a map control (a mini map) of the three-dimensional virtual environment. Alternatively, the marking operation may be an operation of selecting a target location on a three-dimensional virtual environment picture. Alternatively, the marking operation may be an operation of selecting a position from a plurality of candidate locations as a target location. For example, as shown in FIG. 3, the marking operation on a target location 302 may be completed by clicking the target location 302 on a map control 301 of the three-dimensional virtual environment. In another example, a candidate location list is displayed, the candidate location list includes at least one candidate location, a first candidate location is determined as a target location in response to an operation of selecting the first candidate location, and a mark identification is displayed at the target location in the map control and/or the three-dimensional virtual environment. In another embodiment, a player performs the marking operation to mark the target location through peripheral devices such as a pad, a mouse, and a keyboard. In another embodiment, the player may perform the marking operation through virtual reality (VR) glasses, a VR helmet, voice control, a motion sensing operation, and the like.

Figure 4:
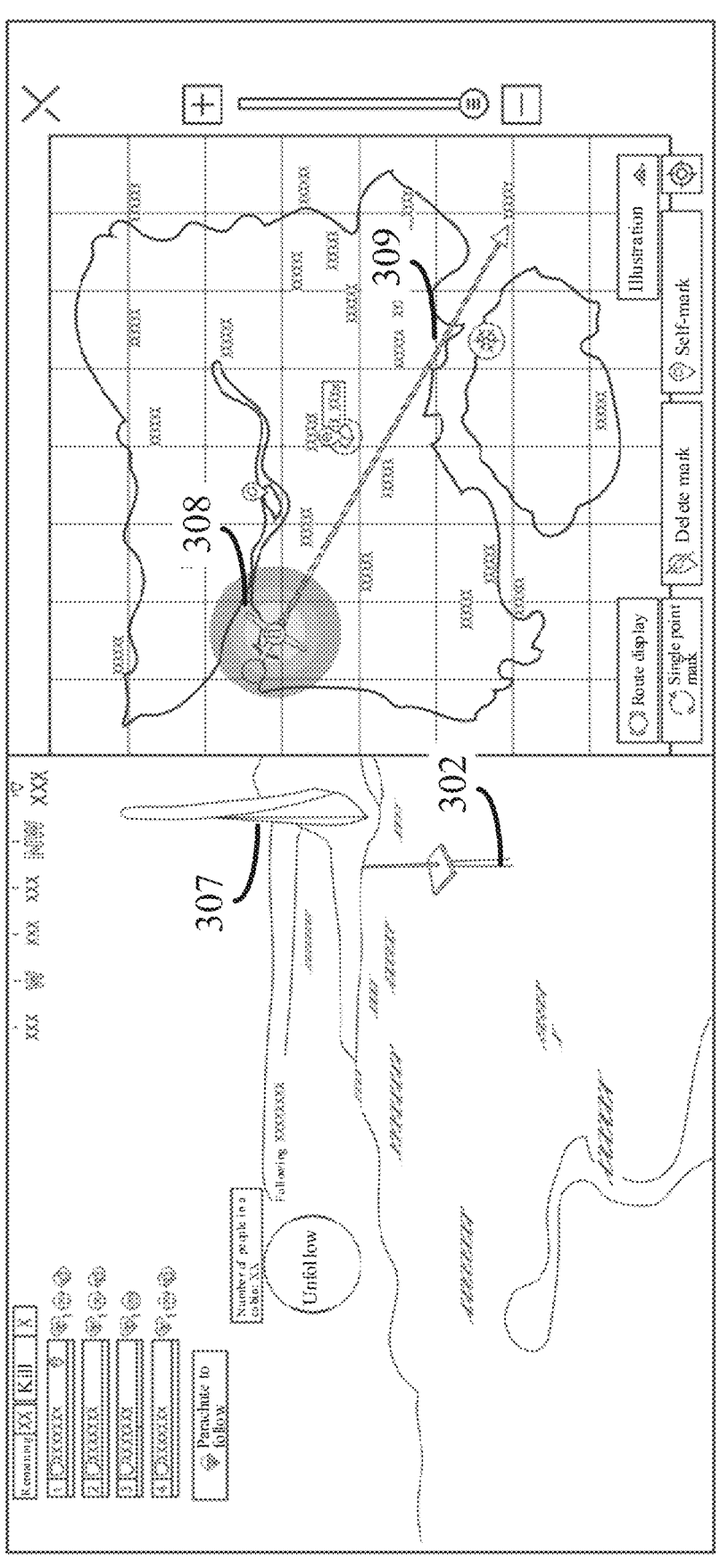
FIG. 4 is a schematic diagram of a guidance method in a three-dimensional virtual environment according to an exemplary embodiment.

After the target location is marked, a marked identifier of the target location is displayed on the map control, or a marked identifier of the target location is displayed in the three-dimensional virtual environment. For example, as shown in FIG. 3, a position identifier is displayed at the target location 302. Alternatively, as shown in FIG. 4, a light column effect that the location is marked is displayed at the target location 302 of the three-dimensional virtual environment. In some embodiments, the target location may also be marked by another virtual character, for example, marked by a teammate of the main control virtual character.

In this embodiment of this application, the user may perform the marking operation on the target location before parachuting, or may perform the marking operation on the target location after parachuting. For example, the method provided in this embodiment of this application is applied to a parachuting process of the main control virtual character. The parachuting process includes the following operations: (1) The main control virtual character navigates along a predetermined route by taking an aircraft. (2) The main control virtual character jumps out of the aircraft in response to a parachuting operation, to glide in the air. (3) The main control virtual character opens a parachute in response to a parachute opening operation, to land slowly in the air. (4) The main control virtual character reaches the ground.

The user may perform the marking operation to mark the target location at any moment in the parachuting process and before the main control virtual character reaches the ground. The target location is located on the ground of the three-dimensional virtual environment. Alternatively, the target location is located on a building in the three-dimensional virtual environment. In some embodiments, the marking operation is an operation of selecting the target location on the map control. The terminal reads two-dimensional coordinates of the target location on the map control, and maps the two-dimensional coordinates to the three-dimensional virtual environment, to obtain two-dimensional horizontal coordinates of the target location on a horizontal plane of the three-dimensional virtual environment. In some embodiments, a detection line is emitted vertically downward from a preset height above the two-dimensional horizontal coordinates, and an intersection point between the detection line and a three-dimensional virtual environment model is the target location, so that three-dimensional coordinates of the target location are obtained.

In some embodiments, the target location is a position marked by the user and a position where the user is intended to control the main control virtual character to reach. The terminal generates a three-dimensional guidance line for the user based on the target location, to guide the user how to control the main control virtual character to reach the location. In some embodiments, the target location is a position that is recommended and marked by the client. Preferably, the target location is an arrival location of the main control virtual character. The client calculates, based on historical landing locations of an account of the user, a position where the user may want to control the main control virtual character to reach, and automatically marks the position in the map control.

Operation 240. Display, when the main control virtual character jumps out of the aircraft and is in a landing state, a three-dimensional path guidance pointing to the target location, the three-dimensional path guidance including a three-dimensional line connecting a first position of the main control virtual character in the air and the target location on the ground, and the three-dimensional path guidance being configured for indicating a manipulation mode for controlling the main control virtual character to land from the first position to the target location.

The first position is a position of the main control virtual character at a first moment. When the main control virtual character is in the landing state, and the marked target location exists, the terminal calculates, based on the first position of the main control virtual character and the target location, a predicted path for landing from the first position to the target location, and displays the three-dimensional path guidance based on the predicted path. The three-dimensional path guidance contains indication information of various operations.

For example, the main control virtual character may perform at least one of the following operations in a landing process: changing a flight direction (any direction throughout) 360°), flying to left front, fly to right front, increasing a descent speed, slowing down a descent speed, and opening a parachute. Operation icons of various operations may be displayed on the three-dimensional path guidance, to indicate the user to execute corresponding operations to control the main control virtual character to move along the three-dimensional path guidance. Alternatively, the three-dimensional path guidance may display speed values at various position points, to indicate a descent speed that the main control virtual character is to be maintain at each position point. Alternatively, the three-dimensional path guidance may display a gliding path and a parachute opening path in different colors, to indicate that when the main control virtual character opens the parachute.

For example, the three-dimensional path guidance includes one three-dimensional line, where the three-dimensional line is a line in three-dimensional space. The three-dimensional line includes at least two three-dimensional coordinate points in the three-dimensional virtual environment. The three-dimensional line may be a straight line, a curve, or a line of any shape. The three-dimensional line is an expected moving path planned by the terminal/server for the main control virtual character. The user controls the main control virtual character to move along the three-dimensional line to accurately land at the target location. The three-dimensional line refers to a line in the three-dimensional space. When there is a two-dimensional plane that can cover at least two three-dimensional coordinate points in the three-dimensional virtual environment, a line connecting the at least two three-dimensional coordinate points on the two-dimensional plane is also considered as a three-dimensional line. In other words, the three-dimensional line in this application is to be more widely understood as a line in three-dimensional virtual space.

The three-dimensional line of the three-dimensional path guidance connects the first position and the target location. A direction of the three-dimensional path guidance is configured for guiding a direction in which the main control virtual character is controlled to land, where the direction of the three-dimensional path guidance includes a direction from the first position to the target location along the three-dimensional path guidance; and/or a slope of the three-dimensional path guidance in a vertical direction is configured for guiding a speed at which the main control virtual character is controlled to land.

Figure 5:
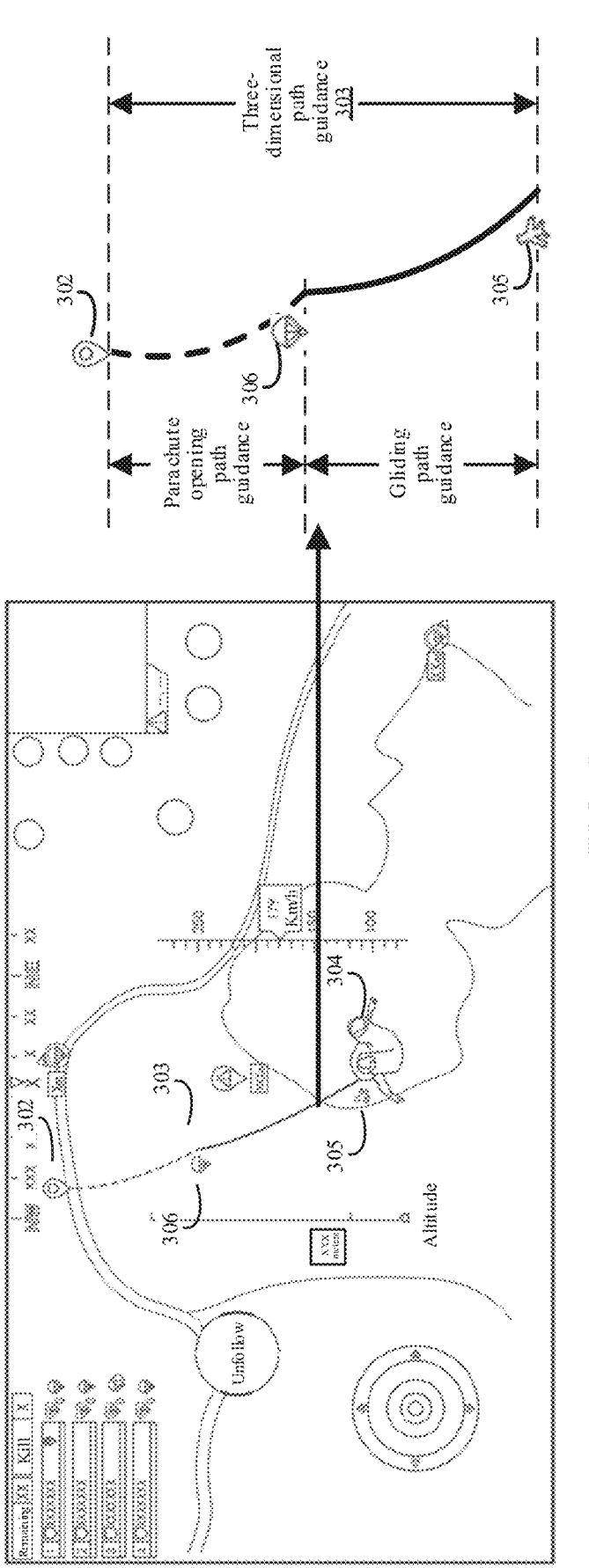
FIG. 5 is a schematic diagram of a guidance method in a three-dimensional virtual environment according to an exemplary embodiment.

For example, as shown in FIG. 5, a three-dimensional path guidance 303 pointing to a target location 302 is displayed in the virtual environment picture, and the three-dimensional path guidance 303 connects a first position of a main control virtual character 304 and the target location 302. The three-dimensional path guidance 303 includes a parachute opening path guidance represented by a dashed line and a gliding path guidance represented by a solid line. In addition, a parachute opening mark 306 "parachute" is displayed near the parachute opening path guidance, and a gliding mark 305 "small aircraft" is displayed near the gliding path guidance.

The user can observe the three-dimensional path guidance from various angles by rotating a viewing angle, to observe and learn information such as a direction and a descent speed indicated by the three-dimensional path guidance. For example, in FIG. 5, the three-dimensional path guidance is observed from a top view perpendicular to a horizontal plane, to observe the direction indicated by the three-dimensional path guidance, to change a flight direction of the main control virtual character and make the flight direction of the main control virtual character close to the direction indicated by the three-dimensional path guidance. The user may also observe the three-dimensional path guidance from an observation angle perpendicular to a vertical plane, to observe the slope of the three-dimensional path guidance in a vertical direction, to change the descent speed of the main control virtual character (where the higher the slope is, the closer the three-dimensional path guidance is to the vertical direction, and the faster the descent speed is; and the lower the slope is, the closer the three-dimensional path guidance is to the horizontal direction, and the slower the descent speed is).

For example, the three-dimensional path guidance is displayed in the three-dimensional virtual environment only when the main control virtual character can reach the target location by parachuting. If the target location cannot be reached by parachuting from the first position of the main control virtual character, the three-dimensional path guidance is not displayed in the three-dimensional virtual environment. The three-dimensional path guidance pointing to the target location is displayed when the main control virtual character jumps out of the aircraft and is in the landing state, and the target location is located in a first reachable range. The first reachable range is determined based on the first position of the main control virtual character.

For example, the first reachable range is an area range that can be reached by landing from the first position of the main control virtual character through a series of operations in the parachuting process.

For example, the main control virtual character may adjust the descent speed in both the gliding state and the parachute opening state, where a descent speed range in the gliding state is from a slowest glide landing speed to a fastest glide landing speed, and a descent speed range in the parachute opening state is from a slowest parachute-opening landing speed to a fastest parachute-opening landing speed. The descent speed, the slowest glide landing speed, the fastest glide landing speed, the slowest parachute-opening landing speed, and the fastest parachute-opening landing speed are all speeds in the vertical direction.

For example, the terminal obtains a current height of the first position of the main control virtual character; divides the current height by the slowest parachute-opening landing speed to obtain maximum landing time, the slowest parachute-opening landing speed being a minimum speed at which the main control virtual character descends in the parachute opening state; multiplies the maximum landing time by a horizontal moving speed to obtain a farthest horizontal distance, the horizontal moving speed being a speed at which the main control virtual character moves in a horizontal direction; calculates a horizontal distance between the first position and the target location; and determines that the target location is in the first reachable range when the horizontal distance is not greater than the farthest horizontal distance.

In an exemplary implementation, the landing speed of the main control virtual character is not adjustable, and the main control virtual character descends based on a default glide landing speed in the gliding state and descends based on a default parachute-opening landing speed in the parachute opening state. The slowest parachute-opening landing speed in the foregoing calculation method may be replaced by the default parachute-opening landing speed.

Operation 260. In response to a change in the position of the main control virtual character, update and display the three-dimensional path guidance based on a changed second position.

The second position is a position of the main control virtual character after the first position is changed. In other words, the second position is a position at which the main control virtual character is located at a second moment. The three-dimensional path guidance changes in real time based on the position of the main control virtual character. The terminal calculates a moving path to the target location in real time based on the position of the main control virtual character, and displays the three-dimensional path guidance based on the moving path. If a calculation result is that it is impossible to land from the second position of the main control virtual character to the target location, the display of the three-dimensional path guidance is canceled.

In conclusion, in the method provided in embodiments of this application, when the main control virtual character marks the target location in the three-dimensional virtual environment before parachuting or in the parachuting process, the three-dimensional path guidance pointing to the target location is displayed in the virtual environment picture, where the three-dimensional path guidance is displayed as the three-dimensional line from the first position of the main control virtual character to the target location, a direction in which the three-dimensional line points to the target location may guide the moving direction of the main control virtual character, and an inclination degree at which the three-dimensional line points to the target location may guide the moving speed of the main control virtual character. In addition, with the movement of the position of the main control virtual character, the three-dimensional path guidance is updated in real time, and the main control virtual character is controlled, based on the three-dimensional path guidance, to accurately land at the target location, thereby improving control precision of the main control virtual character in the parachuting process and improving efficiency of man-machine interaction.

For example, this embodiment of this application provides three manners for guiding the parachuting operation.

Manner 1: After parachuting, if the target location is marked, the three-dimensional path guidance pointing to the target location is displayed in the three-dimensional virtual environment.

Manner 2: Before parachuting, if the target location is marked, the guidance line for leaving the aircraft to reach the target location is displayed on a mini map.

Manner 3: Before parachuting, a parachuting reachable range (a third reachable range) with the aircraft as a center is displayed on the mini map.

The foregoing three guidance manners may be combined in different manners to obtain a new guidance manner. An exemplary embodiment is provided for each manner below. Manner 1:

Based on an exemplary embodiment shown in FIG. 2, the method further includes operation 230 before operation 240, operation 240 may be replaced with operation 240-1 and operation 240-2, and the method further includes operation 250 before operation 240-2. FIG. 6 is a flowchart of a guidance method in a three-dimensional virtual environment according to an exemplary embodiment in this application. The method includes:

Operation 220. Display a marked target location in response to a marking operation, the target location being a target landing location located on the ground of a three-dimensional virtual environment.

For example, execution time of operation 220 may be arbitrary. For example, operation 220 may be performed before operation 230, and to be specific, the marking operation is performed before parachuting. Alternatively, operation 220 may be performed after operation 230, and to be specific, the marking operation is performed after parachuting. Alternatively, operation 220 may also be performed after operation 250, and to be specific, the marking operation is performed after the parachute is opened. In this case, operation 240-1 is not performed.

Operation 230. Control a main control virtual character to jump out of an aircraft to enter a gliding state in response to a parachuting operation.

The gliding state is a state in which the main control virtual character glides in the air before opening the parachute. The parachuting operation may be an operation in which the user triggers a parachute control. For example, the main control virtual character glides in the air after jumping out of the aircraft. In some embodiments, the main control virtual character has a constant horizontal moving speed in the horizontal direction. The horizontal moving speed may be a moving speed of the aircraft. In some embodiments, in the gliding state, the main control virtual character makes a free fall movement in the vertical direction. In the gliding state, the user may adjust a landing speed of the main control virtual character by adjusting a posture of the main control virtual character in the air. For example, the landing state includes at least one of a gliding state and a parachute opening state. When the main control virtual character is in the gliding state, the three-dimensional path guidance includes at least one of a gliding path guidance and a parachute opening path guidance. When the main control virtual character is in the parachute opening state, the three-dimensional path guidance includes the parachute opening path guidance.

Operation 240-1. When the main control virtual character is in the gliding state and the marked target location exists, display the three-dimensional path guidance pointing to the target location, the three-dimensional path guidance including the gliding path guidance and the parachute opening path guidance.

Display styles of the gliding path guidance and the parachute opening path guidance are different. The display style includes at least one of a line style, a color, a display effect, an icon, or a line thickness. For example, as shown in FIG. 5, the gliding path guidance is displayed in dark color and a gliding mark 305 "small aircraft" is displayed next to the gliding path guidance, and the parachute opening path guidance is displayed in light color and a parachute opening mark 306 "parachute" is displayed next to the parachute opening path guidance. The gliding path guidance is configured for guiding an air movement path of the main control virtual character for gliding, the parachute opening path guidance is configured for guiding an air movement path of the main control virtual character after the parachute is opened, the gliding path guidance is connected to the parachute opening path guidance, and a connection point between the gliding path guidance and the parachute opening path guidance is configured for indicating to control the main control virtual character to open the parachute.

When the main control virtual character parachutes, if a mark is made on the mini map, and the marked point (target location) is in a range that can be reached by parachuting, a 3D route guide map (three-dimensional path guidance) is displayed in the three-dimensional virtual environment, and two endpoints of the three-dimensional path guidance are positions of the main control virtual character and the target location respectively. The three-dimensional path guidance marks a gliding road segment and a parachute opening road segment with different colors. For example, a green line indicates that the main control virtual character needs to glide in a current road segment, and a yellow line indicates that the parachute needs to be opened in a current road segment. When a descent speed in the gliding state and the parachute opening state may be adjusted, one implementation of displaying the three-dimensional path guidance includes:

obtaining, by a terminal, a current height of the first position of the main control virtual character;

calculating a first reachable distance, the first reachable distance being a farthest horizontal moving distance after advance parachute opening, the first reachable distance being equal to a product of slowest parachute-opening landing time and a horizontal moving speed of the main control virtual character, the slowest parachute-opening landing time being equal to the current height divided by a slowest parachute-opening landing speed;

calculating a second reachable distance, the second reachable distance being a farthest horizontal moving distance after automatic parachute opening, the second reachable distance being equal to a third distance plus a fourth distance, the third distance being obtained by dividing a first height by a slowest glide landing speed and multiplying by the horizontal moving speed, the first height being equal to the current height minus an automatic parachute opening height, the fourth distance being obtained by dividing the automatic parachute opening height by the slowest parachute-opening landing speed and multiplying by the horizontal moving speed;

calculating a third reachable distance, the third reachable distance being a farthest horizontal gliding distance, the third reachable distance being equal to the third distance; and calculating a horizontal distance between the first position and the target location; and when the horizontal distance is less than the first reachable distance and greater than the second reachable distance, displaying the three-dimensional path guidance pointing to the target location, the three-dimensional path guidance being a straight line connecting the first position and the target location, and the three-dimensional path guidance being displayed as the parachute opening path guidance;

calculating a coordinate position of a first turning point when the horizontal distance is less than the second reachable distance and greater than the third reachable distance, the first turning point being a point on a line connecting the first position and the target location in which a horizontal distance from the target location is equal to a farthest moving distance after automatic parachute opening; and displaying the three-dimensional path guidance, the three-dimensional path guidance including the gliding path guidance connecting the first position and the first turning point, the three-dimensional path guidance including the parachute opening path guidance connecting the first turning point and the target location; or calculating a coordinate position of a second turning point when the horizontal distance is less than the third reachable distance, the second turning point being a point whose height is the automatic parachute opening height on the line connecting the first position and the target location; and displaying the three-dimensional path guidance, the three-dimensional path guidance including the gliding path guidance connecting the first position and the second turning point, the three-dimensional path guidance including the parachute opening path guidance connecting the second turning point and the target location.

As shown in FIG. 7, another implementation of displaying the three-dimensional path guidance includes:

Operation 401. The terminal controls, in response to a parachuting operation on a parachuting button, the main control virtual character to jump out of the aircraft for parachuting.

Operation 402. The terminal judges whether the target location is marked or not, and if the target location is not marked, the three-dimensional path guidance is not displayed; or if the target location is marked, operation 403 is performed.

Operation 403. The terminal judges a distance between the first position of the main control virtual character and the target location, converts, based on the distance and a corresponding algorithm, the distance into a corresponding 3D line segment, and adds a corresponding color, to display the three-dimensional path guidance. For example, as can be obtained through calculation, the first reachable distance is 900 m, the second reachable distance is 500 m, and the third reachable distance is 400 m. The horizontal distance between the first position and the target location is calculated. If the horizontal distance is less than 400 m, or the horizontal distance is greater than 401 m and less than 500 m, or the horizontal distance is greater than 501 m and less than 900 m, the three-dimensional path guidance is calculated by using a corresponding algorithm and then is displayed. If the horizontal distance is greater than 900 m, the three-dimensional path guidance is not displayed.

For example, the three-dimensional path guidance may be obtained in the foregoing implementation or through a neural network model. The neural network model is trained by training samples so that the neural network model can output a three-dimensional line of the three-dimensional path guidance based on an input first position, a target location and a state of the main control virtual character. Subsequently, the first position of the main control virtual character, the target location and the state of the main control virtual character (a gliding state or a parachute opening state) are input into the neural network model, to output the three-dimensional line, and the three-dimensional path guidance is displayed based on the three-dimensional line.

For example, as shown in (1) in FIG. 8, after parachuting, the main control virtual character has a horizontal moving speed in a horizontal direction, if a landing speed in a vertical direction is constant, a moving track of the main control virtual character is a slanting line, and the main control virtual character moves forward while landing downward. As shown in (2) in FIG. 8, a distance of the three-dimensional line of the three-dimensional path guidance is calculated through the terminal. Assuming that a descent speed of the main control virtual character during gliding is 2 m/s, the horizontal moving speed is 1 m/s, a descent speed of parachute opening is 1 m/s, a flight height of the aircraft is 900 m (to be specific, a height at which the main control virtual character parachutes), and if the main control virtual character does not actively open the parachute at a height of 100 m from the ground, the terminal automatically opens the parachute. Assuming that a horizontal moving distance of the main control virtual character after parachuting is X, a horizontal moving distance of gliding is A, and a horizontal moving distance of parachuting is B, $X=A+B$, and $900=2A+B$, where A is always less than 400 m, and B is always greater than 100 m. Assuming that the horizontal distance between the first position of the main control virtual character and the target location is 700 m, $700=A+B$, and $900=2A+B$, and in this case, $A=200$, and $B=500$. In other words, the main control virtual character needs to horizontally glide forward by 200 m, and open the parachute to horizontally move forward by 500 m.

Operation 250. Control, in response to the parachute opening operation, the main control virtual character to open the parachute to enter the parachute opening state.

The parachute opening state is a state in which the main control virtual character descends in the air after the parachute is opened. The parachute opening operation may be an operation in which the user triggers a parachute opening control. For example, the main control virtual character glides in the air after jumping out of the aircraft. Subsequently, the user can control the main control virtual character to open the parachute by triggering the parachute opening control. In some embodiments, in the parachute opening state, the main control virtual character has a constant horizontal moving speed in the horizontal direction. The horizontal moving speed may be a moving speed of the aircraft. In the parachute opening state, the user may adjust the parachute to adjust a landing speed of the main control virtual character.

Operation 240-2. Display, when the main control virtual character is in the parachute opening state and the marked target location exists, a three-dimensional path guidance pointing to the target location, the three-dimensional path guidance including a parachute opening path guidance, the parachute opening path guidance being configured for guiding an air movement path of the main control virtual character after the parachute is opened.

When a descent speed of the main control virtual character in the parachute opening state may be adjusted, one implementation of displaying the three-dimensional path guidance includes:

obtaining, by the terminal, a current height of the first position of the main control virtual character;

calculating a fourth reachable distance, the fourth reachable distance being a farthest horizontal moving distance after parachute opening, the fourth reachable distance being equal to a product of slowest parachute-opening landing time and a horizontal moving speed of the main control virtual character, the slowest parachute-opening landing time being equal to the current height divided by a slowest parachute-opening landing speed; and calculating a horizontal distance between the first position and the target location; and when the horizontal distance is less than the fourth reachable distance, displaying the three-dimensional path guidance pointing to the target location, the three-dimensional path guidance being a straight line connecting the first position and the target location, and the three-dimensional path guidance being displayed as the parachute opening path guidance.

Operation 260. In response to a change in the position of the main control virtual character, update and display the three-dimensional path guidance based on a changed second position.

The second position is a position of the main control virtual character after the first position is changed. In other words, the second position is a position at which the main control virtual character is located at a second moment. For example, the display of the three-dimensional path guidance is canceled in response to that the main control virtual character reaches the ground, or in response to that the target location is out of a reachable range.

In conclusion, in the method provided in embodiments of this application, the three-dimensional path guidance in the three-dimensional virtual environment is displayed after the main control virtual character parachutes, and the three-dimensional path guidance is displayed as the three-dimensional line. By observing a direction and a slope of the three-dimensional line, the user can learn the moving direction and the descent speed. By observing a color of the three-dimensional line, the user can learn a landing state that the main control virtual character needs to keep at a current road segment. By observing an intersection point between two colored line segments on the three-dimensional line, the user can learn timing to control the main control virtual character to open the parachute. For a novice user, the user only needs to control the main control virtual character to make its movement path to close to the three-dimensional path guidance as much as possible, and the main control virtual character may be controlled to accurately land at the target location, thereby improving accuracy of a parachuting operation by the novice user and improving efficiency of man-machine interaction.

Figure 9:
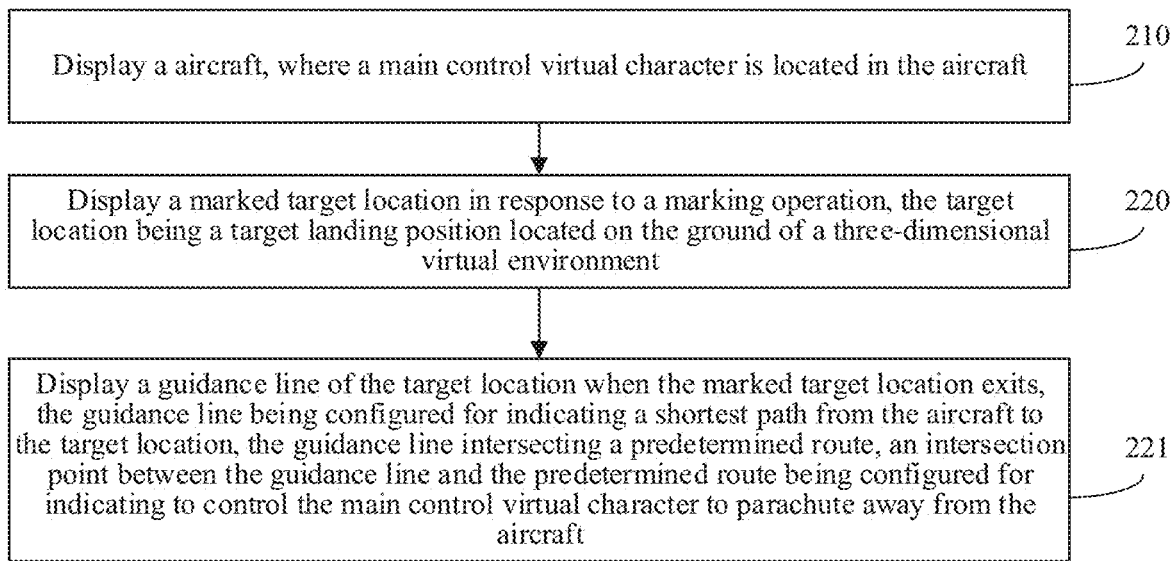
FIG. 9 is a flowchart of a guidance method in a three-dimensional virtual environment according to an exemplary embodiment.

Manner 2:

Based on an exemplary embodiment shown in FIG. 2, the method further includes operation 210 before operation 220, and operation 220 is followed by operation 221. FIG. 9 is a flowchart of a guidance method in a three-dimensional virtual environment according to an exemplary embodiment in this application. The method includes:

Operation 210. Display the aircraft, the main control virtual character being located in the aircraft, and the aircraft flying along a predetermined route.

For example, as shown in FIG. 4, a three-dimensional model 307 of the aircraft is displayed in the virtual environment picture. Alternatively, an icon of the aircraft is displayed on a map control (a mini map) of the three-dimensional virtual environment. As shown in FIG. 4, the icon 308 of the aircraft moves along the predetermined route 309 on the map control. In this case, because the main control virtual character is located in the aircraft, the main control virtual character may not be displayed in the virtual environment picture. The predetermined route is a route randomly indicated by a terminal or a server after the game starts. The predetermined route may be at least one of a straight line, a curve, or an irregular line. For example, the predetermined route is displayed on the map control. For example, the predetermined route is a line that is parallel to the horizontal plane, that is, the aircraft flies at the same horizontal height. Alternatively, the predetermined route is a line that is not parallel to the horizontal plane, that is, the flight height of the aircraft may be arbitrary.

Operation 220. Display a marked target location in response to a marking operation, the target location being a target landing location located on the ground of a three-dimensional virtual environment.

Operation 221. Display a guidance line of the target location when the marked target location exits, the guidance line being configured for indicating a shortest path for leaving from the aircraft to reach the target location, the guidance line intersecting the predetermined route, an intersection point between the guidance line and the predetermined route being configured for indicating to control the main control virtual character to parachute away from the aircraft.

For example, the guidance line is a line segment displayed on the map control. The guidance line is configured for indicating timing for controlling the main control virtual character to perform a parachuting operation, and the guidance line is further configured for indicating a horizontal moving distance between a gliding road segment and a parachute opening road segment after parachuting.

Alternatively, the guidance line is a line segment displayed in the three-dimensional virtual environment, the guidance line is displayed on a flight plane of the aircraft in the three-dimensional virtual environment, a height of the flight plane is equal to a flight height of the aircraft, and the flight plane is parallel to the horizontal plane.

For example, the guidance line pointing to the target location is displayed in the three-dimensional virtual environment and on the map control in response to that the main control virtual character is located in the aircraft and the marked target location exists, and the guidance line is located on the flight plane. The guidance line pointing to the target location is displayed on the map control in response to that the main control virtual character is in the landing state and the marked target location exists.

Figure 10:
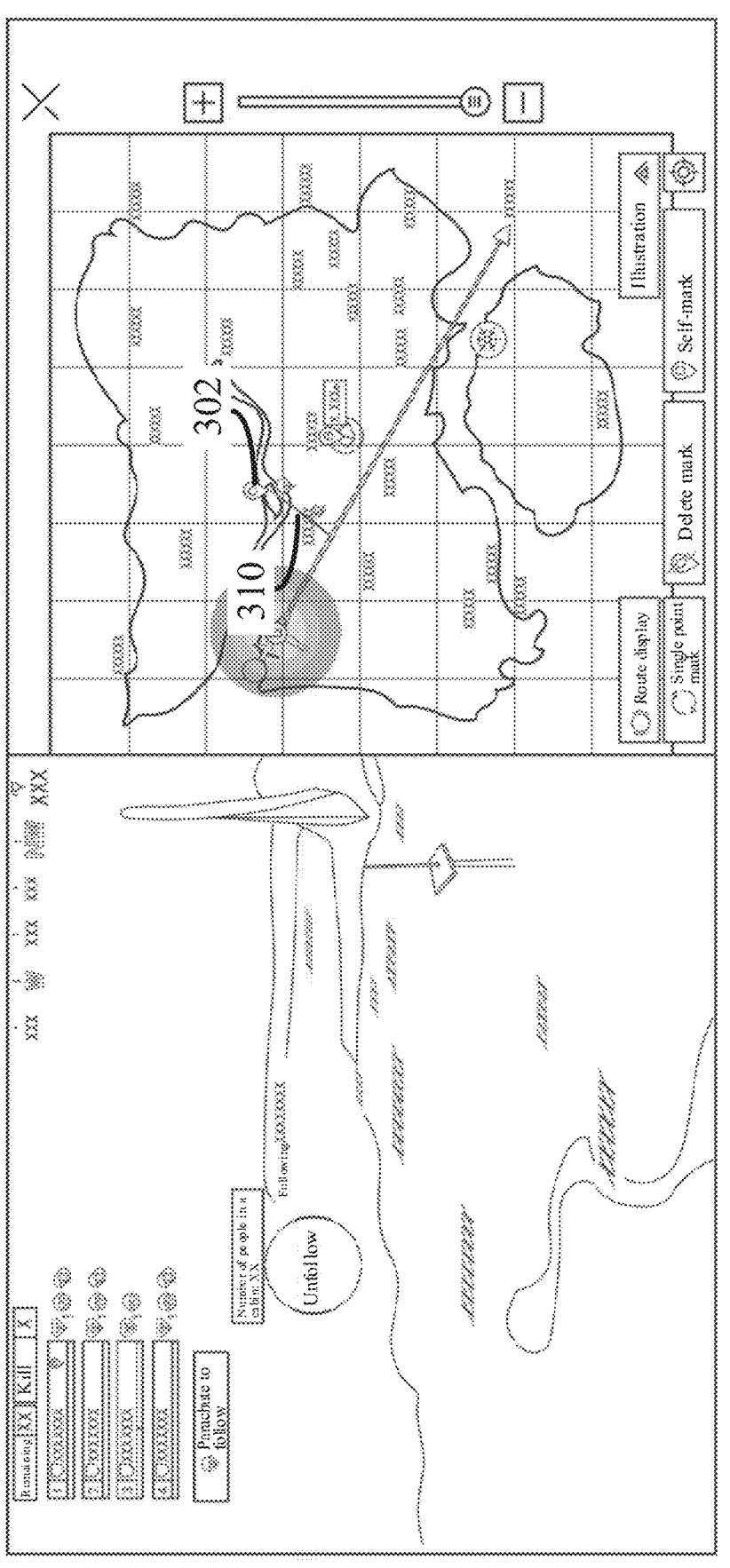
FIG. 10 is a schematic diagram of a guidance method in a three-dimensional virtual environment according to an exemplary embodiment.

When the target location is located in front of a current position of the aircraft, the guidance line includes a line segment in which the target location is perpendicular to the predetermined route. For example, as shown in FIG. 10, when the target location is located in front of a flight direction of the aircraft, the guidance line 310 is a line segment perpendicular to the predetermined route from the target location 302.

Figure 11:
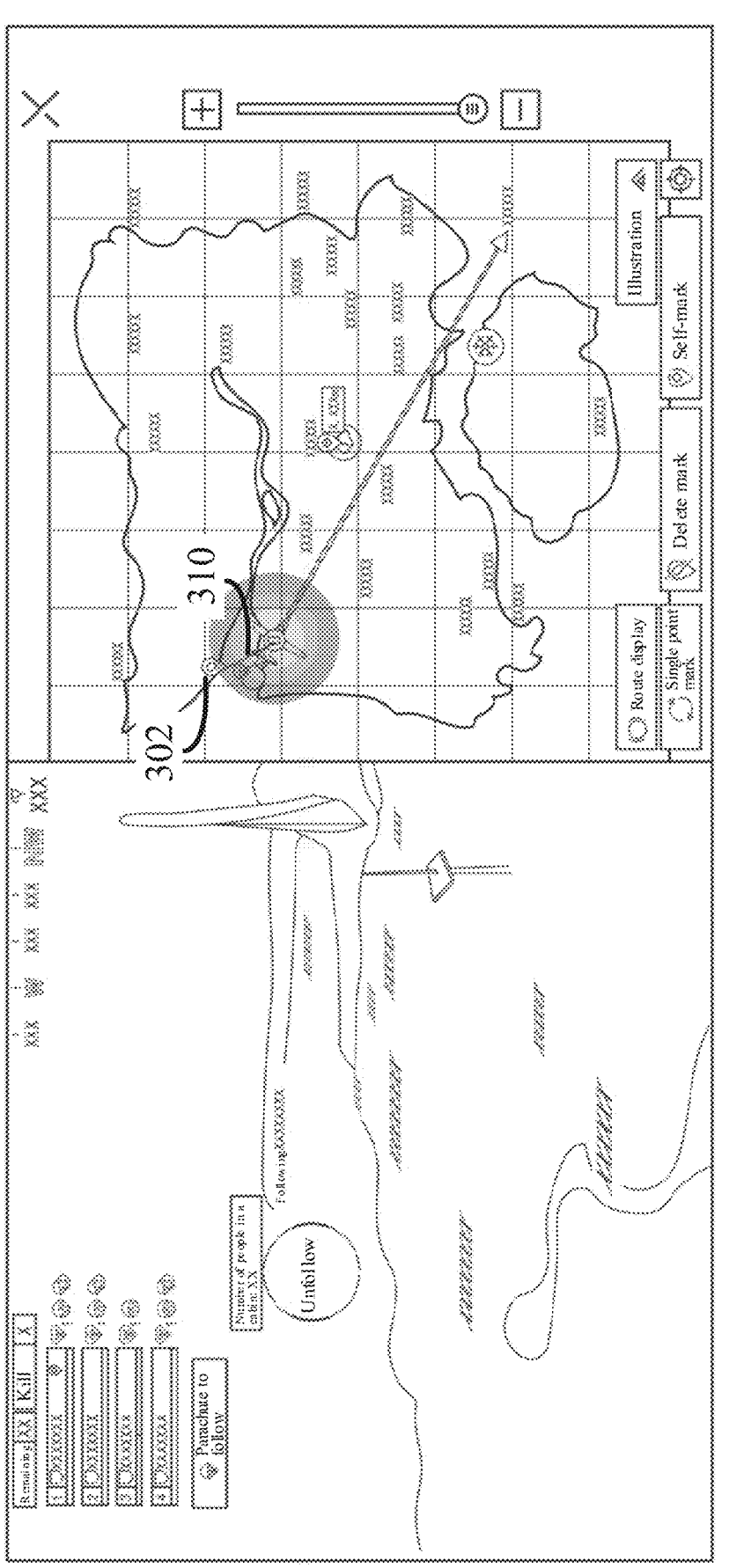
FIG. 11 is a schematic diagram of a guidance method in a three-dimensional virtual environment according to an exemplary embodiment.

When the target location is located behind the aircraft, the guidance line includes a line segment connecting the target location and the position of the aircraft. For example, as shown in FIG. 11, when the target location is located behind the flight direction of the aircraft, the guidance line 310 is a line segment from the target location 302 to the position at which the aircraft is located.

The guidance line includes a gliding line segment and a parachute opening line segment, the gliding line segment and the parachute opening line segment have different display styles, the gliding line segment is configured for indicating a road segment in which the main control virtual character is controlled to glide in the air, the parachute opening line segment is configured for indicating a road segment in which the main control virtual character is controlled to open a parachute for landing, and an intersection point between the gliding line segment and the parachute opening line segment is configured for indicating to control the main control virtual character to open the parachute. The display style includes at least one of a line style, a color, a display effect, an icon, or a line thickness.

Figure 12:
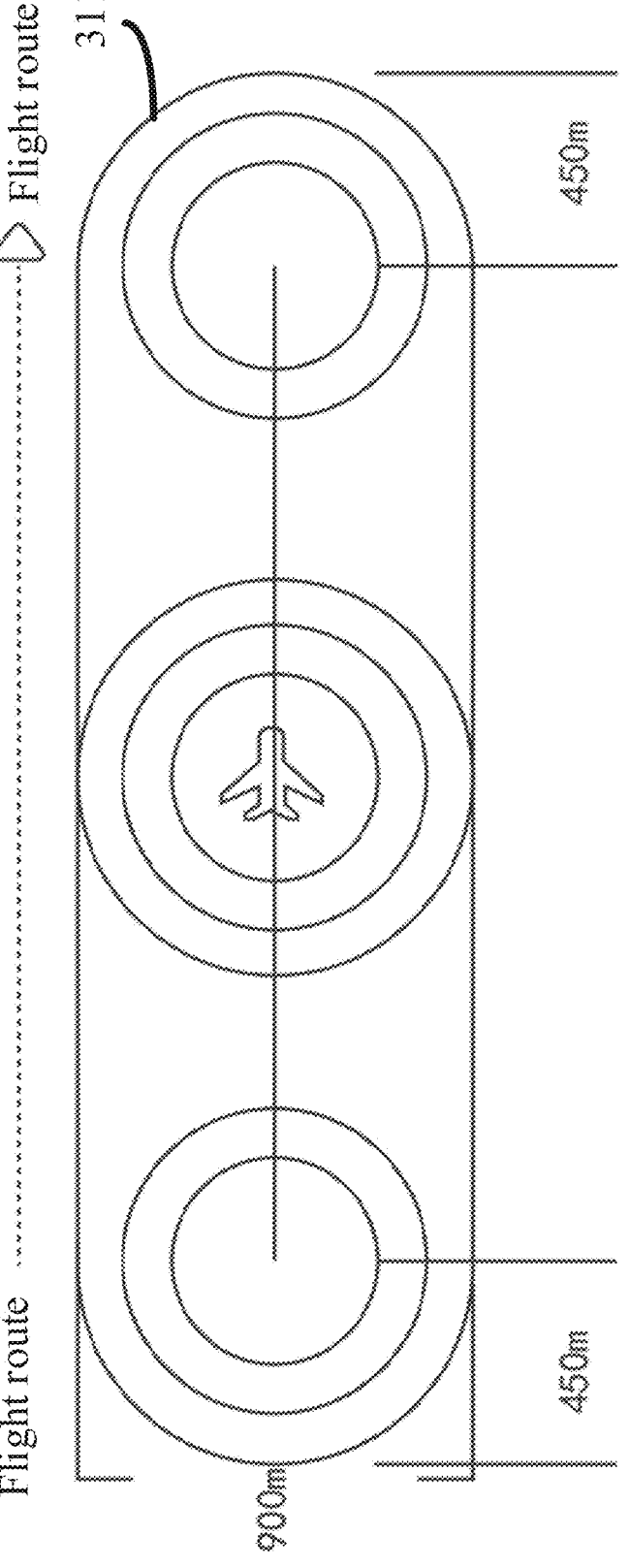
FIG. 12 is a schematic diagram of a guidance method in a three-dimensional virtual environment according to an exemplary embodiment.

The guidance line of the target location is displayed on the map control of the three-dimensional virtual environment when the target location is located in a second reachable range. The second reachable range is determined based on a farthest parachuting distance and a remaining route of the aircraft, and the farthest parachuting distance is a farthest horizontal distance that the main control virtual character parachutes away from the aircraft. For example, the farthest parachuting distance is obtained by dividing the flight height of the aircraft by the slowest parachute-opening landing speed and multiplying by the horizontal moving speed. The slowest parachute-opening landing speed is a minimum landing speed of the main control virtual character in the vertical direction after the parachute is opened. The horizontal moving speed is a moving speed in the horizontal direction of the main control virtual character after parachuting. The second reachable range includes a rounded rectangular range formed by a plurality of circular ranges with the farthest parachuting distance as a radius and each point on the remaining route of the aircraft as a center. For example, as shown in FIG. 12, assuming that the farthest parachuting distance is 450 m, the second reachable range 311 is a rounded rectangle with a height of 900 m and a width of 900 m plus a remaining route length.

Figure 13:
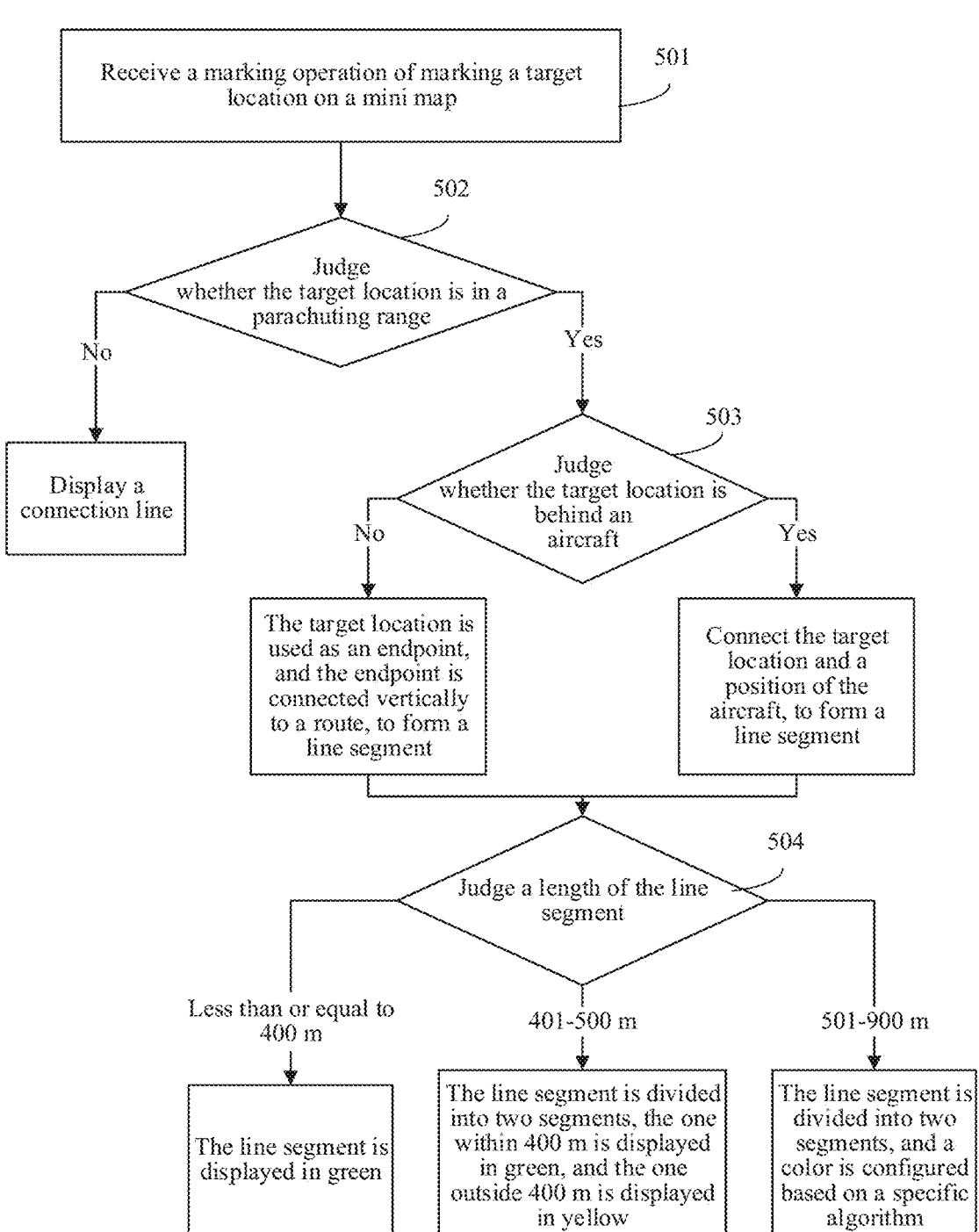
FIG. 13 is a flowchart of a guidance method in a three-dimensional virtual environment according to an exemplary embodiment.

For example, as shown in FIG. 13, a method for displaying an indication line is provided.

Operation 501. The terminal receives the marking operation of marking the target location on the mini map.

Operation 502. The terminal judges whether the target location is in a parachuting range (the second reachable range). If the target location is not in the range, the line from the position of the aircraft to the target location is displayed. If the target location is in the range, operation 503 is performed.

Operation 503. The terminal judges whether the target location is behind the aircraft, and if the target location is in front of the aircraft, a line segment using the target location as an endpoint and perpendicular to the route is displayed;

or if the target location is behind the aircraft, a line segment from the target location to the position of the aircraft is displayed.

Operation 504. The terminal judges a length of the line segment of the indication line. If the indication line is less than or equal to the third reachable distance (400 m), the indication line is displayed in green, indicating that the target location may be reached by gliding. If the indication line is greater than the third reachable distance (400 m) and less than the second reachable distance (500 m), the indication line is displayed as two segments, the one within 400 m is displayed in green, the one outside 400 m is displayed in yellow, green indicates the gliding road segment, yellow indicates the parachute opening road segment, and yellow indicates that the user may wait for automatic parachute opening without performing the parachute opening operation. If the indication line is greater than the second reachable distance (500 m) and less than the first reachable distance (900 m), the indication line is displayed as two segments. The gliding road segment and the parachute opening road segment are obtained based on an algorithm, the gliding road segment is displayed in green and the parachute opening road segment is displayed in red, and red indicates that the user needs to open the parachute in advance, or otherwise, the main control virtual character cannot reach the target location.

For example, the guidance line provided in this embodiment and the three-dimensional path guidance provided in the embodiments shown in FIG. 2 and FIG. 6 may be displayed simultaneously after the main control virtual character parachutes. For example, when the main control virtual character is in the landing state and the marked target location exists, the guidance line pointing to the target location is displayed on the map control, and the three-dimensional path guidance pointing to the target location is displayed in the three-dimensional virtual environment.

In conclusion, in the method provided in embodiments of this application, the guidance line pointing to the target location is displayed on the mini map after the user marks the target location. If the target location is reachable and the target location is located in front of the aircraft, the line segment in which the target location is perpendicular to the predetermined route is displayed, and an intersection point between the line segment and the predetermined route is the position for controlling the main control virtual character to parachute; or if the target location is reachable and the target location is located behind the aircraft, the line segment connecting the target location and the position of the aircraft is displayed, to prompt the main control virtual character to parachute as soon as possible. In addition, on the guidance line, different road segments are displayed in different colors, for example, the gliding road segment is displayed in green, an automatic parachute opening road segment is displayed in yellow, and an advance parachute opening road segment is displayed in red, to prompt the user of a position at which the parachute is opened, thereby guiding the parachuting operation by the user. In this way, the user can control the main control virtual character to land at the target location accurately.

Manner 3:

Based on an exemplary embodiment shown in FIG. 2, the method further includes operation 210 and operation 211 before operation 220. FIG. 14 is a flowchart of a guidance method in a three-dimensional virtual environment according to an exemplary embodiment in this application. The method includes:

Operation 210. Display an aircraft, where a main control virtual character is located in the aircraft.

For example, as shown in FIG. 4, a three-dimensional model 307 of the aircraft is displayed in the virtual environment picture.

Alternatively, an icon of the aircraft is displayed on a map control (a mini map) of a three-dimensional virtual environment. As shown in FIG. 4, the icon 308 of the aircraft is displayed on the map control.

In this case, because the main control virtual character is located in the aircraft, the main control virtual character may not be displayed in the virtual environment picture.

Operation 211. Display a third reachable range based on a position of the aircraft, the third reachable range including a circular range whose center is the position of the aircraft and whose radius is a farthest parachuting distance.

The farthest parachuting distance is obtained by dividing a flight height of the aircraft by a slowest parachute-opening landing speed and multiplying by a horizontal moving speed. The third reachable range is configured for indicating an area range that the main control virtual character can reach after parachuting.

For example, a third reachable range may be displayed centered on the position of the aircraft. Alternatively, three reachable ranges may be displayed centered on the position of the aircraft. In other words, the third reachable range is split into a plurality of subranges for indicating an area range that the user can reach by different parachuting operations.

The third reachable range centered on the position of the aircraft is displayed on map space of the three-dimensional virtual environment, the third reachable range includes at least one of a gliding reachable range, an automatic parachute opening reachable range, or an advance parachute opening reachable range, and the gliding reachable range, the automatic parachute opening reachable range, and the advance parachute opening reachable range are concentric circles.

The gliding reachable range is configured for indicating an area range that the main control virtual character can reach through gliding. The automatic parachute opening reachable range is configured for indicating that the main control virtual character does not need to actively perform a parachute opening operation, and only needs to wait to reach an area range that the automatic parachute opening height can reach when the terminal automatically opens the parachute. The advance parachute opening reachable range is configured for indicating that the main control virtual character cannot wait for automatic parachute opening and needs to open the parachute independently in advance, to reach an area range that can be reached.

Because a landing speed of the main control virtual character slows down after the parachute is opened, a horizontal distance that the main control virtual character can move is farther. Therefore, the sooner the main control virtual character opens the parachute, the farther the main control virtual character can land by parachuting.

The gliding reachable range includes a circular range whose center is a position of the aircraft and whose radius is a farthest gliding distance. The automatic parachute opening reachable range includes a circular range whose center is the position of the aircraft and whose radius is a first distance, where the first distance is a sum of the farthest gliding distance and a farthest moving distance after automatic parachute opening. The advance parachute opening reachable range includes a circular range whose center is the position of aircraft and whose radius is a farthest moving distance after advance parachute opening.

Figure 15:
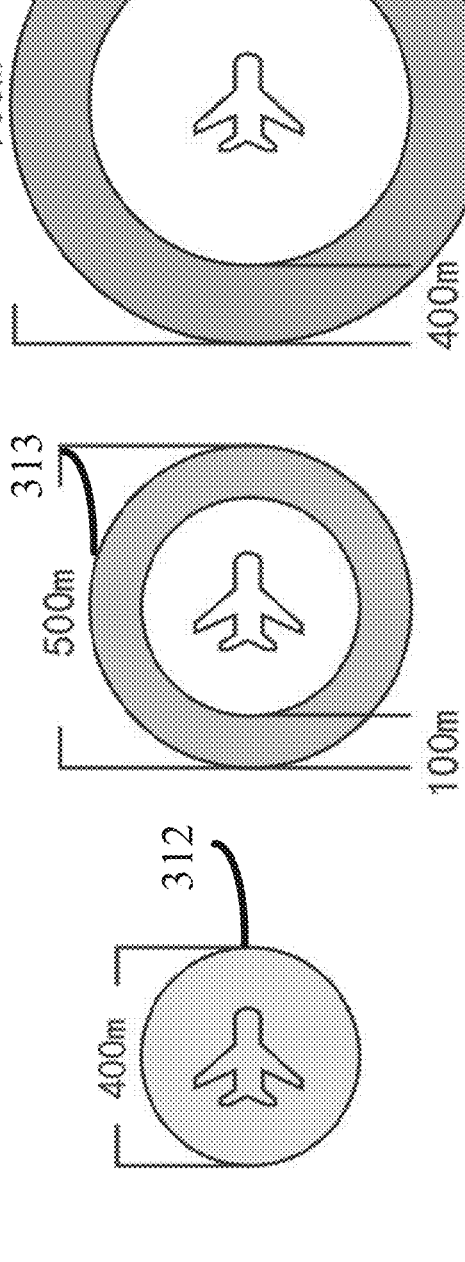
FIG. 15 is a schematic diagram of a guidance method in a three-dimensional virtual environment according to an exemplary embodiment.

The farthest gliding distance is obtained by dividing second height by the slowest glide landing speed and multiplying by a horizontal moving speed. The second height is equal to a flight height minus the automatic parachute opening height. The farthest moving distance after automatic parachute opening is obtained by dividing the automatic parachute opening height by the slowest parachute-opening landing speed and multiplying by the horizontal moving speed. A farthest moving distance after advance parachute opening is obtained by dividing the flight height by the slowest parachute-opening landing speed and multiplying by the horizontal moving speed. For example, as shown in FIG. 15, the farthest gliding distance is 200 m, the farthest moving distance after automatic parachute opening is 50 m, and the farthest moving distance after advance parachute opening is 450 m. In this way, a gliding reachable range 312 is a circular range with a radius of 200 m, an automatic parachute opening reachable range 313 is a circular range with a radius of 250 m minus the gliding reachable range, and an advance parachute opening reachable range 314 is a circular range with a radius of 450 m minus the automatic parachute opening reachable range.

Figure 16:
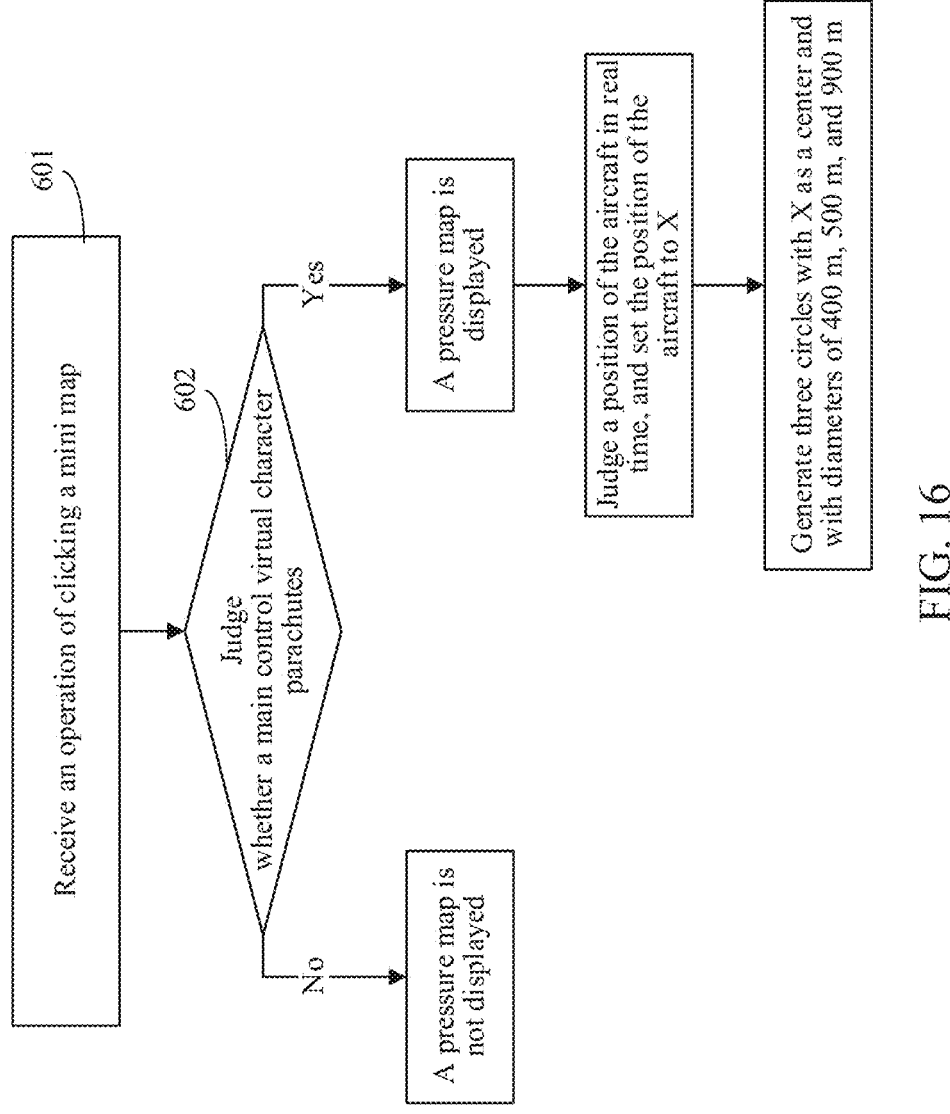
FIG. 16 is a flowchart of a guidance method in a three-dimensional virtual environment according to an exemplary embodiment.

For example, display styles of the three ranges are different, and the display style includes at least one of a color, a line, a filling pattern, an icon, or a display effect. For example, the three ranges are displayed as concentric circles, and colors of different ranges are different. For example, as shown in FIG. 4, on the map control, the third reachable range is displayed centered on the icon 308 of the aircraft, and the third reachable range is displayed as three concentric circles. A location in this third reachable range may be reached by the main control virtual character by parachuting. For example, as shown in FIG. 16, a method for displaying the third reachable range is provided.

Operation 601. The terminal receives an operation of clicking a mini map and displays an enlarged large map.

Operation 602. The terminal judges whether the main control virtual character parachutes, and if the main control virtual character has parachuted, a pressure map (the third reachable range) is not displayed on the large map. If the main control virtual character has not parachuted, the pressure map (the third reachable range) is displayed on the aircraft icon of the large map.

The method for displaying the pressure map is to obtain a two-dimensional coordinate position X of the aircraft on the large map, and display three concentric circles centered on X, and radii of the concentric circles are obtained based on the calculation method in the foregoing embodiments. For example, the three radii are 200 m, 250 m, and 450 m respectively.

In conclusion, in the method provided in embodiments of this application, three concentric circles centered on an aircraft are displayed on the large map before the main control virtual character parachutes. The three circular ranges respectively indicate an area that may be reached by gliding, an area that may be reached by automatically opening the parachute, and an area that may be reached by opening the parachute in advance. The user may learn an operation mode after parachuting by observing an area in which an expected landing position is located. If the expected landing position is in the area that may be reached by gliding or the area that may be reached by automatically opening the parachute, the user does not need to manually open the parachute, and can wait until the automatic parachute opening height is reached and the terminal automatically controls the main control virtual character to open the parachute. If the expected landing position is in the area that may be reached by opening the parachute in advance, the user needs to open the parachute in advance. The method visually displays the area that may be reached by parachuting on the map space, and accurately conveys the area that may be reached by different parachuting operations to the user by using colors, to guide the parachuting operation by the user, thereby improving accuracy of controlling, by the user, the main control virtual character to parachute, and improving efficiency of man-machine interaction.

Figure 17:
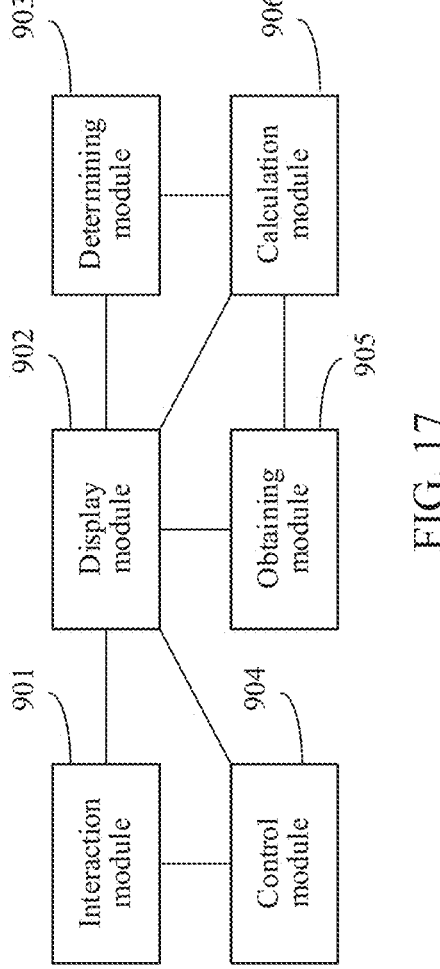
FIG. 17 is a structural block diagram of a guidance apparatus in a three-dimensional virtual environment according to an exemplary embodiment.

FIG. 17 is a structural block diagram of a guidance apparatus in a three-dimensional virtual environment according to an exemplary embodiment, and the apparatus includes:

an interaction module 901, configured to receive a marking operation;

a display module 902, configured to display a marked target location in response to the marking operation, the target location being a target landing location located on the ground of a three-dimensional virtual environment, where the display module 902 is configured to display, when a main control virtual character jumps out of an aircraft and is in a landing state, a three-dimensional path guidance pointing to the target location, the three-dimensional path guidance including a three-dimensional line connecting a first position of the main control virtual character in the air and the target location on the ground, and the three-dimensional path guidance being configured for indicating a manipulation mode for controlling the main control virtual character to land from the first position to the target location; and the display module 902 is configured to: in response to a change in the position of the main control virtual character, update and display the three-dimensional path guidance based on a changed second position.

In an exemplary embodiment, the interaction module 901 further performs the parachuting operation and the parachute opening operation in the foregoing method embodiments. The apparatus further includes a control module 904, where the control module 904 is configured to perform related content of controlling the main control virtual character to perform the activities in the foregoing method embodiments. The display module 902 is further configured to perform content related to a screen display picture in the foregoing method embodiments. In another exemplary embodiment, the apparatus further includes an obtaining module 905, a calculation module 906, and a determining module 903. The obtaining module 905, the calculation module 906, and the determining module 903 are configured to perform the foregoing related content of generating the three-dimensional path guidance. For specific content, refer to the foregoing method embodiments.

Figure 18:
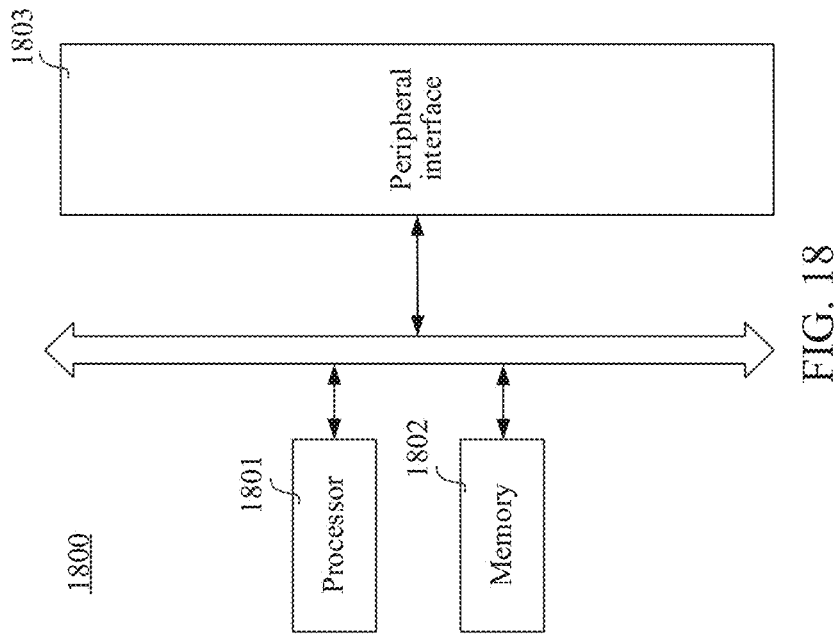
FIG. 18 is a structural block diagram of a computer device according to an exemplary embodiment.

FIG. 18 is a structural block diagram of a computer device 1800 according to an exemplary embodiment of this application. The computer device 1800 may be a portable mobile terminal, such as a smartphone, a tablet computer, a Moving Picture Experts Group Audio Layer III (MP3) player, a Moving Picture Experts Group Audio Layer IV (MP4) player, a notebook computer, or a desktop computer. The computer device 1800 may also be referred to as another name such as user equipment, a portable terminal, a laptop terminal, or a desktop terminal.

Generally, the computer device 1800 includes a processor 1801 and a memory 1802.

The processor 1801 may include one or more processing cores, for example, a 4-core processor or an 8-core processor. The processor 1801 may be implemented in at least one hardware form of a digital signal processor (DSP), a field-programmable gate array (FPGA), and a programmable logic array (PLA). The processor 1801 may further include a main processor and a coprocessor. The main processor is a processor configured to process data in an awake state, and is also referred to as a central processing unit (CPU). The coprocessor is a low power consumption processor configured to process the data in a standby state. In some embodiments, the processor 1801 may be integrated with a graphics processing unit (GPU). The GPU is configured to render and draw content that needs to be displayed on a display screen. In some embodiments, the processor 1801 may further include an artificial intelligence (AI) processor. The AI processor is configured to process computing operations related to machine learning. The memory 1802 may include one or more computer-readable storage media. The computer-readable storage medium may be non-transient. The memory 1802 may further include a high-speed random access memory and a nonvolatile memory, for example, one or more disk storage devices or flash storage devices. In some embodiments, the non-transitory computer-readable storage medium in the memory 1802 is configured to store at least one instruction, and the at least one instruction being configured to be executed by the processor 1801 to implement the guidance method in a three-dimensional virtual environment provided in the method embodiments of this application. In some embodiments, the computer device 1800 may alternatively include: a peripheral interface 1803. A person skilled in the art may understand that the structure shown in FIG. 18 constitutes no limitation on the computer device 1800, and the computer device may include more or fewer components than those shown in the figure, or some components may be combined, or a different component deployment may be used.

This application further provides a non-transitory computer-readable storage medium, the storage medium stores at least one instruction, at least one program, and a code set or an instruction set, and the at least one instruction, the at least one program, and the code set or the instruction set being loaded and executed by the processor to implement the guidance method in a three-dimensional virtual environment according to the foregoing method embodiments.

This application provides a computer program product or computer programs. The computer program product or computer programs include computer instructions. The computer instructions are stored in a non-transitory computer-readable storage medium. A processor of the computer device reads the computer instructions from a computer-readable storage medium, the computer instructions, when executed by a processor, causing the computer device to perform the guidance method in a three-dimensional virtual environment according to the foregoing method embodiments.

In sum, the term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module.

What is claimed is:

1. A method for guiding a virtual character to jump out of an aircraft in a three-dimensional virtual environment performed by a computer device, the method comprising:

in response to a marking operation by a user of the computer device, marking a target landing location on the ground of the three-dimensional virtual environment;

in accordance with a determination that the virtual character jumps out of the aircraft and is in a landing state, displaying a three-dimensional path guidance line connecting a first position of the virtual character in the air and the target landing location on the ground, and the three-dimensional path guidance line indicating a manipulation mode for controlling the virtual character to land from the first position to the target location; and dynamically updating the three-dimensional path guidance line based on a current second position of the virtual character in the air.

2. The method according to claim 1, wherein the method further comprises:

before displaying the three-dimensional path guidance line:

in response to a parachuting operation by the user of the computer device, controlling the virtual character to jump out of the aircraft to enter a gliding state; and the displaying a three-dimensional path guidance line connecting a first position of the virtual character in the air and the target landing location on the ground further comprises:

displaying the three-dimensional path guidance line pointing to the target landing location, the three-dimensional path guidance line comprising a gliding path guidance line and a parachute opening path guidance line.

3. The method according to claim 2, wherein:

the gliding path guidance line is configured for guiding an air movement path of the virtual character for gliding, the parachute opening path guidance is configured for guiding an air movement path of the virtual character after the parachute is opened, and a connection point between the gliding path guidance line and the parachute opening path guidance line is configured for indicating a position to control the virtual character to open the parachute.

4. The method according to claim 1, wherein the method further comprises:

before displaying the three-dimensional path guidance line:

in response to a parachute opening operation by the user of the computer device, controlling the virtual character to open a parachute to enter a parachute opening state; and the displaying a three-dimensional path guidance line connecting a first position of the virtual character in the air and the target landing location on the ground further comprises:

displaying the three-dimensional path guidance line pointing to the target landing location, the three-dimensional path guidance line comprising a parachute opening path guidance line for guiding an air movement path of the virtual character after the parachute is opened.

5. The method according to claim 1, wherein:

a direction of the three-dimensional path guidance line is configured for guiding a direction in which the virtual character is configured to land from the first position to the target landing location along the three-dimensional path guidance line; and a slope of the three-dimensional path guidance line in a vertical direction of the three-dimensional virtual environment is configured for guiding a speed at which the virtual character is configured to land from the first position to the target landing location along the three-dimensional path guidance line.

6. The method according to claim 1, wherein the displaying a three-dimensional path guidance line connecting a first position of the virtual character in the air and the target landing location on the ground comprises:

displaying the three-dimensional path guidance line pointing to the target location when the target landing location is within a first reachable range from the first position of the virtual character.

7. The method according to claim 1, wherein the method further comprises: before the displaying, when a main control virtual character jumps out of an aircraft and is in a landing state, a three-dimensional path guidance pointing to the target location, the method further comprises:

before displaying the three-dimensional path guidance line:

displaying the aircraft and the virtual character being located in the aircraft flying along a predetermined route; and displaying a guidance line from the aircraft to the target landing location when the marked target landing location exits, an intersection point between the guidance line and a predetermined route of the aircraft indicating a position to control the virtual character to parachute away from the aircraft.

8. A computer device, comprising a processor and a memory, a computer program being stored in the memory, and the computer program being loaded and executed by the processor and causing the computer device to perform a method for guiding a virtual character to jump out of an aircraft in a three-dimensional virtual environment, the method including:

in response to a marking operation by a user of the computer device, marking a target landing location on the ground of the three-dimensional virtual environment;

in accordance with a determination that the virtual character jumps out of the aircraft and is in a landing state, displaying a three-dimensional path guidance line connecting a first position of the virtual character in the air and the target landing location on the ground, and the three-dimensional path guidance line indicating a manipulation mode for controlling the virtual character to land from the first position to the target location; and dynamically updating the three-dimensional path guidance line based on a current second position of the virtual character in the air.

9. The computer device according to claim 8, wherein the method further comprises:

before displaying the three-dimensional path guidance line:

in response to a parachuting operation by the user of the computer device, controlling the virtual character to jump out of the aircraft to enter a gliding state; and the displaying a three-dimensional path guidance line connecting a first position of the virtual character in the air and the target landing location on the ground further comprises:

displaying the three-dimensional path guidance line pointing to the target landing location, the three-dimensional path guidance line comprising a gliding path guidance line and a parachute opening path guidance line.

10. The computer device according to claim 9, wherein: the gliding path guidance line is configured for guiding an air movement path of the virtual character for gliding, the parachute opening path guidance is configured for guiding an air movement path of the virtual character after the parachute is opened, and a connection point between the gliding path guidance line and the parachute opening path guidance line is configured for indicating a position to control the virtual character to open the parachute.

11. The computer device according to claim 8, wherein the method further comprises:

before displaying the three-dimensional path guidance line:

in response to a parachute opening operation by the user of the computer device, controlling the virtual character to open a parachute to enter a parachute opening state; and the displaying a three-dimensional path guidance line connecting a first position of the virtual character in the air and the target landing location on the ground further comprises:

displaying the three-dimensional path guidance line pointing to the target landing location, the three-dimensional path guidance line comprising a parachute opening path guidance line for guiding an air movement path of the virtual character after the parachute is opened.

12. The computer device according to claim 8, wherein:

a direction of the three-dimensional path guidance line is configured for guiding a direction in which the virtual character is configured to land from the first position to the target landing location along the three-dimensional path guidance line; and a slope of the three-dimensional path guidance line in a vertical direction of the three-dimensional virtual environment is configured for guiding a speed at which the virtual character is configured to land from the first position to the target landing location along the three-dimensional path guidance line.

13. The computer device according to claim 8, wherein the displaying a three-dimensional path guidance line connecting a first position of the virtual character in the air and the target landing location on the ground comprises:

displaying the three-dimensional path guidance line pointing to the target location when the target landing location is within a first reachable range from the first position of the virtual character.

14. The computer device according to claim 8, wherein the method further comprises: before the displaying, when a main control virtual character jumps out of an aircraft and is in a landing state, a three-dimensional path guidance pointing to the target location, the method further comprises:

before displaying the three-dimensional path guidance line:

displaying the aircraft and the virtual character being located in the aircraft flying along a predetermined route; and displaying a guidance line from the aircraft to the target landing location when the marked target landing location exits, an intersection point between the guidance line and a predetermined route of the aircraft indicating a position to control the virtual character to parachute away from the aircraft.

15. A non-transitory computer-readable storage medium, having a computer program stored therein, and the computer program being loaded and executed by a processor of a computer device and causing the computer device to perform a method for guiding a virtual character to jump out of an aircraft in a three-dimensional virtual environment, the method including:

in response to a marking operation by a user of the computer device, marking a target landing location on the ground of the three-dimensional virtual environment;

in accordance with a determination that the virtual character jumps out of the aircraft and is in a landing state, displaying a three-dimensional path guidance line connecting a first position of the virtual character in the air and the target landing location on the ground, and the three-dimensional path guidance line indicating a manipulation mode for controlling the virtual character to land from the first position to the target location; and dynamically updating the three-dimensional path guidance line based on a current second position of the virtual character in the air.

16. The non-transitory computer-readable storage medium according to claim 15, wherein the method further comprises:

before displaying the three-dimensional path guidance line:

in response to a parachuting operation by the user of the computer device, controlling the virtual character to jump out of the aircraft to enter a gliding state; and the displaying a three-dimensional path guidance line connecting a first position of the virtual character in the air and the target landing location on the ground further comprises:

displaying the three-dimensional path guidance line pointing to the target landing location, the three-dimensional path guidance line comprising a gliding path guidance line and a parachute opening path guidance line.

17. The non-transitory computer-readable storage medium according to claim 15, wherein the method further comprises:

before displaying the three-dimensional path guidance line:

in response to a parachute opening operation by the user of the computer device, controlling the virtual character to open a parachute to enter a parachute opening state; and the displaying a three-dimensional path guidance line connecting a first position of the virtual character in the air and the target landing location on the ground further comprises:

displaying the three-dimensional path guidance line pointing to the target landing location, the three-dimensional path guidance line comprising a parachute opening path guidance line for guiding an air movement path of the virtual character after the parachute is opened.

18. The non-transitory computer-readable storage medium according to claim 15, wherein:

a direction of the three-dimensional path guidance line is configured for guiding a direction in which the virtual character is configured to land from the first position to the target landing location along the three-dimensional path guidance line; and a slope of the three-dimensional path guidance line in a vertical direction of the three-dimensional virtual environment is configured for guiding a speed at which the virtual character is configured to land from the first position to the target landing location along the three-dimensional path guidance line.

19. The non-transitory computer-readable storage medium according to claim 15, wherein the displaying a three-dimensional path guidance line connecting a first position of the virtual character in the air and the target landing location on the ground comprises:

displaying the three-dimensional path guidance line pointing to the target location when the target landing location is within a first reachable range from the first position of the virtual character.

20. The non-transitory computer-readable storage medium according to claim 15, wherein the method further comprises: before the displaying, when a main control virtual character jumps out of an aircraft and is in a landing state, a three-dimensional path guidance pointing to the target location, the method further comprises:

before displaying the three-dimensional path guidance line:

displaying the aircraft and the virtual character being located in the aircraft flying along a predetermined route; and displaying a guidance line from the aircraft to the target landing location when the marked target landing location exits, an intersection point between the guidance line and a predetermined route of the aircraft indicating a position to control the virtual character to parachute away from the aircraft.

\* \* \* \* \*